United States Patent
Koban et al.

(10) Patent No.: US 12,071,582 B2
(45) Date of Patent: Aug. 27, 2024

(54) PROCESS AND METHODS FOR RECLAIMING FLAMMABLE AND NON-FLAMMABLE HYDROFLUORO-OLEFIN CONTAINING REFRIGERANTS

(71) Applicant: THE CHEMOURS COMPANY FC, LLC, Wilmington, DE (US)

(72) Inventors: Mary E. Koban, Chadds Ford, PA (US); Joshua Hughes, Wilmington, DE (US); Karl Robert Krause, Kennett Square, PA (US); Barbara Haviland Minor, Elkton, MD (US); Sheng Peng, Hockessin, DE (US); Pradeep Sharma, Wilmington, DE (US); Jian Sun-Blanks, Earleville, MD (US); Hans Westdijk, Oud-Beijerland (NL)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 702 days.

(21) Appl. No.: 17/268,141

(22) PCT Filed: Mar. 6, 2020

(86) PCT No.: PCT/US2020/021387
§ 371 (c)(1),
(2) Date: Feb. 12, 2021

(87) PCT Pub. No.: WO2020/185558
PCT Pub. Date: Sep. 17, 2020

(65) Prior Publication Data
US 2021/0301189 A1  Sep. 30, 2021

Related U.S. Application Data

(60) Provisional application No. 62/952,667, filed on Dec. 23, 2019, provisional application No. 62/815,490, filed on Mar. 8, 2019.

(51) Int. Cl.
*C09K 5/04* (2006.01)
*F25B 45/00* (2006.01)

(52) U.S. Cl.
CPC .............. *C09K 5/045* (2013.01); *F25B 45/00* (2013.01); *C09K 2205/126* (2013.01); *F25B 2345/002* (2013.01)

(58) Field of Classification Search
CPC ................ C09K 2205/126; C09K 5/06; F25B 2345/002; F25B 2345/004; F25B 45/00
See application file for complete search history.

(56) References Cited

U.S. PATENT DOCUMENTS 5,255,527 A * 10/1993 Paige .................... G01N 1/2035
                                                        62/85
5,758,506 A *  6/1998 Hancock .................. F25B 45/00
                                                        62/149

(Continued)

FOREIGN PATENT DOCUMENTS

CN    108140449 B    10/2019
JP    06341737 A     12/1994

(Continued)

OTHER PUBLICATIONS

PCT International Search Report and Written Opinion mailed Jun. 24, 2020 for PCT International Application No. PCT/US2020/021387.

(Continued)

*Primary Examiner* — Nelson J Nieves

(57) ABSTRACT

A method and apparatus for reclaiming refrigerant. The method includes transferring, an unreclaimed refrigerant composition, including one or more hydrofluoro olefins, from a source vessel to a receiving vessel and transporting the receiving vessel to a recycling center. The unreclaimed refrigerant composition is analyzed to determine the composition of the unreclaimed refrigerant composition sample.

(Continued)

A target composition is determined, based on the analyzed unreclaimed refrigerant composition, and one or more treatments are determined, based on the target composition. The unreclaimed refrigerant composition is treated, with the one or more treatments, to form a reclaimed refrigerant composition having the composition of the reclaimed refrigerant composition is equal to the target composition.

35 Claims, 11 Drawing Sheets

(56) References Cited

U.S. PATENT DOCUMENTS

| | | | | |
|---|---|---|---|---|
| 6,000,230 | A * | 12/1999 | Kanno | F17C 7/00 141/47 |
| 6,202,433 | B1 * | 3/2001 | Murray | B60H 1/00585 62/149 |
| 6,442,963 | B1 * | 9/2002 | Pfefferle | F25B 45/00 62/77 |
| 7,293,419 | B1 * | 11/2007 | Moller | B60H 1/00585 62/149 |
| 7,708,903 | B2 | 5/2010 | Sievert et al. | |
| 8,012,368 | B2 | 9/2011 | Nappa et al. | |
| 8,070,976 | B2 | 12/2011 | Nappa et al. | |
| 8,147,709 | B2 | 4/2012 | Mahler et al. | |
| 8,205,462 | B1 | 6/2012 | Zugibe | |
| 8,333,902 | B2 | 12/2012 | Mahler et al. | |
| 8,425,795 | B2 | 4/2013 | Nappa et al. | |
| 8,544,287 | B1 | 10/2013 | Kugibe | |
| 8,692,037 | B2 | 4/2014 | Mahler et al. | |
| 8,695,364 | B1 | 4/2014 | Zugibe | |
| 8,877,086 | B2 | 11/2014 | Mahler et al. | |
| 8,911,640 | B2 | 12/2014 | Nappa et al. | |
| 9,051,500 | B2 | 6/2015 | Nappa | |
| 9,194,620 | B2 * | 11/2015 | McMasters | F25B 45/00 |
| 9,308,408 | B2 | 4/2016 | Nappa | |
| 9,410,064 | B2 | 8/2016 | Nappa et al. | |
| 9,486,657 | B2 | 11/2016 | Mahler et al. | |
| 9,519,891 | B1 | 12/2016 | Zugibe | |
| 9,540,557 | B2 | 1/2017 | Nappa et al. | |
| 9,943,717 | B2 | 4/2018 | Nappa | |
| 10,713,628 | B1 | 7/2020 | Zugibe | |
| 10,926,215 | B2 | 2/2021 | Low et al. | |
| 11,007,471 | B2 | 5/2021 | Sharratt et al. | |
| 11,162,720 | B2 * | 11/2021 | Crombie | F25B 43/00 |
| 11,702,379 | B2 * | 7/2023 | Peng | C07C 17/383 570/236 |
| 2003/0074909 | A1 * | 4/2003 | Heiden | F25B 43/043 62/195 |
| 2006/0243944 | A1 | 11/2006 | Minor et al. | |
| 2007/0108403 | A1 | 5/2007 | Sievert et al. | |
| 2007/0284555 | A1 | 12/2007 | Leek et al. | |
| 2009/0145143 | A1 * | 6/2009 | McMasters | F25B 45/00 62/149 |
| 2009/0241560 | A1 * | 10/2009 | Murray | B60H 1/00585 62/77 |
| 2009/0278075 | A1 | 11/2009 | Mahler et al. | |
| 2011/0031436 | A1 | 2/2011 | Mahler et al. | |
| 2011/0078918 | A1 * | 4/2011 | Koura | B01D 1/14 34/236 |
| 2011/0203310 | A1 * | 8/2011 | Gomi | B01D 53/002 95/205 |
| 2012/0240477 | A1 | 9/2012 | Nappa | |
| 2013/0298578 | A1 * | 11/2013 | McMasters | F25B 45/00 62/77 |
| 2013/0298995 | A1 | 11/2013 | McMasters et al. | |
| 2014/0216074 | A1 * | 8/2014 | Minor | C09K 23/017 62/119 |
| 2015/0153082 | A1 * | 6/2015 | Lundberg | F25B 43/006 62/85 |
| 2017/0321938 | A1 * | 11/2017 | Cantadori | F28D 21/0003 |
| 2019/0003755 | A1 * | 1/2019 | Crombie | F25B 43/00 |
| 2019/0120434 | A1 * | 4/2019 | Sanhaji | F25B 45/00 |
| 2021/0092496 | A1 * | 3/2021 | Pistone | F25B 49/005 |
| 2021/0116158 | A1 * | 4/2021 | Yamaguchi | F25B 45/00 |
| 2021/0122962 | A1 * | 4/2021 | Allgood | C09K 5/045 |

FOREIGN PATENT DOCUMENTS

| | | | |
|---|---|---|---|
| JP | 2013002720 A * | 1/2013 | |
| JP | 2013002720 A | 1/2013 | |
| JP | 2013113461 A | 6/2013 | |
| JP | 2016200358 A | 12/2016 | |
| WO | 2004105971 A1 | 12/2004 | |
| WO | 200706044 A1 | 1/2007 | |
| WO | 2007105425 A1 | 9/2007 | |
| WO | 2017027716 A1 | 2/2017 | |
| WO | 2017131095 A1 | 8/2017 | |
| WO | 2019111877 A1 | 6/2019 | |
| WO | 2020003509 A1 | 1/2020 | |
| WO | 2021048949 A1 | 3/2021 | |

OTHER PUBLICATIONS

Hamlin, Sally, Analysis of Equipment and Practices in the Reclamation Industry, Oct. 29, 2010, Sections 1.1, 2.1-2.4, 5.2.

AHRI Standard 700 with Addendum 1, 2017 Standard for Specifications for Refrigerants, Sep. 2017.

AHRI Standard 700, 2016 Standard for Specifications for Refrigerants.

* cited by examiner

PROCESS AND METHODS FOR RECLAIMING FLAMMABLE AND NON-FLAMMABLE HYDROFLUORO-OLEFIN CONTAINING REFRIGERANTS

This Application claims the benefit of Application No. 62/815,490, filed on Mar. 8, 2019 and Application No. 62/952,667, filed on Dec. 23, 2019. The disclosures of Application Nos. 62/815,490 and 62/952,667 are hereby incorporated by reference.

FIELD

The present invention is directed to the recovery and reclamation of low global warming potential, high value, refrigerants, including refrigerants that have some level of flammability.

BACKGROUND

Hydrofluoro-olefins (HFOs) have been proposed as alternatives to replace chlorofluorocarbons (CFCs), hydrochlorofluorocarbons (HCFCs), and hydrofluorocarbons (HFCs) which can potentially damage the Earth's ozone layer and/or contribute to global warming. Hydrofluoro-olefins do not contain chlorine and, thus, cannot degrade the Earth's ozone layer.

Hydrofluoro-olefins (HFOs), such as HFO-1234yf, (2,3,3,3-tetrafluoropropene) which exhibits a global warming potential (GWP) of less than 1, have replaced older, less environmentally friendly, refrigerants. The olefinic portion of the hydrofluoro-olefin molecule may exhibit reactivity toward materials encountered during use. Typically, HFO reactivity is encountered during extreme use conditions (i.e. conditions outside the normal operating conditions of the refrigerant and/or refrigerant blend), mis-use such as blending with incompatible products or introducing counterfeit materials or inadvertent contamination. Therefore, the resultant reactivity of the HFO portion of the refrigerant or refrigerant blend may degrade in such a way as to result in unwanted by-products. The resulting formation of bi-products introduces materials into the refrigerant composition which can degrade the desired or intended performance of the refrigerant. One source of impurities may be the result of side reactions acting on one or more of the refrigerants in the system. The side reactions may result from various processes including, for example, thermal degradation, polymerization, oxidation, or hydration. The side reactions may occur between materials in the system or as a result of external materials gaining entry to the system, such as air or water. The resulting impurities may include, for example, alcohols, aldehydes, ketones, oligomers, or polymers resulting from the reaction of one or more refrigerants. Another source of impurities may result from side reactions acting on other materials present in the system, such as lubricant oils. These may include, for example, polyolesters, polyvinyl ethers, polyaklylene glycols, mineral oils or alkyl benzene oils. In one embodiment, polyolester lubricants may hydrolyze to the corresponding acid. The resulting impurities may be present as solids, liquids, or gases. Additionally, materials such as thread locking agents can also initiate unwanted by-products. Other sources of unwanted contaminants include plasticizers from hoses, gaskets and o-rings. Since, the refrigerants now have unknown impurities in them that cannot be conveniently removed during a recovery, or recycle processes, these refrigerants are considered degraded Conventionally, degraded refrigerants are discarded (destroyed), and the system is recharged with fresh, ie, new or virgin refrigerants or refrigerant blends. While this was the conventional practice, this leads to unnecessary loss of high value refrigerant or refrigerant blends. Thus, there is a need for methods to recycle and reclaim degraded refrigerant compositions for further use in the existing system or re-use in a totally new system. It may also be desirable to improve the degraded refrigerant or refrigerant blend, remove the contaminants and re-blend the neat or existing blend with other materials to form a new blend or even an improved performance blend.

SUMMARY

The instant invention can solve problems associated with conventional practices by providing compositions, equipment and methods for recycling and reclaiming refrigerant containing compositions.

Definitions

Refrigerant recovery constitutes removing refrigerant from refrigerant containing equipment to another container without improvement of the refrigerant.

Refrigerant recycle constitutes removing some contaminants using procedures or processes that reduce oil, water, acidity, and particulates. Refrigerant processed during recycle is not tested by analytical procedures such as GC-FID, GC-TCD or GC MS. While the refrigerant is improved somewhat, recycled refrigerant does not meet the Air Conditioning, Heating, and Refrigeration Institute (AHRI) specification 700. AHRI 700 (2017): Specification for Refrigerants denotes the able levels of contaminants (purity requirements) for fluorocarbon, hydrocarbon, and carbon dioxide refrigerants regardless of source and lists acceptable test methods.

Refrigerant reclaim constitutes removing oil, water, acidity, particulates, residues and other impurities which can negatively impact refrigerant quality and hence performance. Reclamation involves reprocessing the used (or recovered) refrigerant such that reprocessed refrigerants meet AHRI 700 quality specifications. Refrigerant quality is verified by analytical techniques such as GC-FID, GC-TCD, GC-MS, FTIR, Goetz Bub, Karl Fischer, Byk-Garner Color and various other analytical methods.

In an embodiment, a method of reclaiming refrigerant, including transferring, an unreclaimed refrigerant composition, including one or more hydrofluoro olefins, from a source vessel (or equipment) to a receiving vessel and transporting the receiving vessel to a recycling center. The unreclaimed refrigerant composition is analyzed to determine the composition of the unreclaimed refrigerant composition sample. A target composition is determined, based on the analyzed unreclaimed refrigerant composition, and one or more treatments are determined, based on the target composition. The unreclaimed refrigerant composition is treated, with the one or more treatments, to form a reclaimed refrigerant composition having target composition.

In an embodiment, an apparatus for treating a flammable refrigerant composition, including a treatment unit having one or more treatment modules configured to treat the flammable refrigerant composition. The flammable refrigerant composition includes a hydrofluoro-olefin and the treatment unit includes one or more of a blending module, a distillation module, a nitrogen purging module, a filtration module, a dehydration module, a caustic scrubbing module, or a decanting module.

In an embodiment, a method of reclaiming refrigerant, including receiving, from a customer, an analysis of an unreclaimed refrigerant composition and determining a target composition based on the analysis. One or more treatments are determined, based on the target composition. A mobile treatment unit is dispatched, including one or more treatment modules, configured to perform the one or more treatments. The mobile treatment unit treats the unreclaimed refrigerant composition, to form a reclaimed refrigerant composition, including the target composition. In some embodiments, the target composition includes at least one of 2,3,3,3-tetrafluoropropene (HFO-1234yf) or trans-1,3,3,3-tetrafluoro-1-propene (HFO-1234ze(E)), trans-1-chloro-3,3,3-trifluoropropene, trans-dichloroethylene, (Z)-1,1,1,4,4,4-hexafluoro-2-butene, 1,1,1,2-tetrafluoroethane, pentafluoroethane, or 1,1-difluoromethane.

The hydrofluoro-olefins that can be reclaimed may comprise at least one of these hydrofluoro-olefin refrigerants:
1,2,3,3,3-pentafluoro-1-propene ($CHF=CFCF_3$),
1,1,3,3,3-pentafluoro-1-propene ($CF_2=CHCF_3$),
1,1,2,3,3-pentafluoro-1-propene ($CF_2=CFCHF_2$),
1,2,3,3-tetrafluoro-1-propene ($CHF=CFCHF_2$),
2,3,3,3-tetrafluoro-1-propene ($CH_2=CFCF_3$),
1,3,3,3-tetrafluoro-1-propene$CHF=CHCF_3$),
1,1,2,3-tetrafluoro-1-propene ($CF_2=CFCH_2F$),
1,1,3,3-tetrafluoro-1-propene ($CF_2=CHCHF_2$),
1,2,3,3-tetrafluoro-1-propene ($CHF=CFCHF_2$),
3,3,3-trifluoro-1-propene ($CH_2=CHCF_3$),
2,3,3-trifluoro-1-propene ($CHF_2CF=CH_2$);
1,1,2-trifluoro-1-propene ($CH_3CF=CF_2$);
1,2,3-trifluoro-1-propene ($CH_2FCF=CF_2$);
1,1,3-trifluoro-1-propene ($CH_2FCH=CF_2$);
1,3,3-trifluoro-1-propene ($CHF_2CH=CHF$);
1,1,1,2,3,4,4,4-octafluoro-2-butene ($CF_3CF=CFCF_3$);
1,1,2,3,3,4,4,4-octafluoro-1-butene ($CF_3CF_2CF=CF_2$);
1,1,1,2,4,4,4-heptafluoro-2-butene ($CF_3CF=CHCF_3$);
1,2,3,3,4,4,4-heptafluoro-1-butene ($CHF=CFCF_2CF_3$);
1,1,1,2,3,4,4-heptafluoro-2-butene ($CHF_2CF=CFCF_3$);
1,3,3,3-tetrafluoro-2-(trifluoromethyl)-1-propene (($CF_3)_2C=CHF$);
1,1,3,3,4,4,4-heptafluoro-1-butene ($CF_2=CHCF_2CF_3$);
1,1,2,3,4,4,4-heptafluoro-1-butene ($CF_2=CFCHFCF_3$);
1,1,2,3,3,4,4-heptafluoro-1-butene ($CF_2=CFCF_2CHF_2$);
2,3,3,4,4,4-hexafluoro-1-butene ($CF_3CF_2CF=CH_2$);
1,3,3,4,4,4-hexafluoro-1-butene ($CHF=CHCF_2CF_3$);
1,2,3,4,4,4-hexafluoro-1-butene ($CHF=CFCHFCF_3$);
1,2,3,3,4,4-hexafluoro-1-butene ($CHF=CFCF_2CHF_2$);
1,1,2,3,4,4-hexafluoro-2-butene ($CHF_2CF=CFCHF_2$);
1,1,1,2,4,4-hexafluoro-2-butene ($CH_2FCF=CFCF_3$);
1,1,1,2,4,4-hexafluoro-2-butene ($CHF_2CH=CFCF_3$);
1,1,1,3,4,4-hexafluoro-2-butene ($CF_3CH=CFCHF_2$);
1,1,2,3,3,4-hexafluoro-1-butene ($CF_2=CFCF_2CH_2F$);
1,1,2,3,4,4-hexafluoro-1-butene ($CF_2=CFCHFCHF_2$);
3,3,3-trifluoro-2-(trifluoromethyl)-1-propene ($CH_2=C(CF_3)_2$);
1,1,1,2,4-pentafluoro-2-butene ($CH_2FCH=CFCF_3$);
1,1,1,3,4-pentafluoro-2-butene ($CF_3CH=CFCH_2F$);
3,3,4,4,4-pentafluoro-1-butene ($CF_3CF_2CH=CH_2$);
1,1,1,4,4-pentafluoro-2-butene ($CHF_2CH=CHCF_3$);
1,1,1,2,3-pentafluoro-2-butene ($CH_3CF=CFCF_3$);
2,3,3,4,4-pentafluoro-1-butene ($CH_2=CFCF_2CHF_2$);
1,1,2,4,4-pentafluoro-2-butene ($CHF_2CF=CHCHF_2$);
1,1,2,3,3-pentafluoro-1-butene ($CH_3CF_2CF=CF_2$);
1,1,2,3,4-pentafluoro-2-butene ($CH_2FCF=CFCHF_2$);
1,1,3,3,3-pentafluoro-2-methyl-1-propene ($CF_2=C(CF_3)(CH_3)$);
2-(difluoromethyl)-3,3,3-trifluoro-1-propene ($CH_2=C(CHF_2)(CF_3)$);
2,3,4,4,4-pentafluoro-1-butene ($CH_2=CFCHFCF_3$);
1,2,4,4,4-pentafluoro-1-butene ($CHF=CFCH_2CF_3$);
1,3,4,4,4-pentafluoro-1-butene ($CHF=CHCHFCF_3$);
1,3,3,4,4-pentafluoro-1-butene ($CHF=CHCF_2CHF_2$);
1,2,3,4,4-pentafluoro-1-butene ($CHF=CFCHFCHF_2$);
3,3,4,4-tetrafluoro-1-butene ($CH_2=CHCF_2CHF_2$);
1,1-difluoro-2-(difluoromethyl)-1-propene ($CF_2=C(CHF_2)(CH_3)$);
1,3,3,3-tetrafluoro-2-methyl-1-propene ($CHF=C(CF_3)(CH_3)$);
3,3-difluoro-2-(difluoromethyl)-1-propene ($CH_2=C(CHF_2)_2$);
1,1,1,2-tetrafluoro-2-butene ($CF_3CF=CHCH_3$);
1,1,1,3-tetrafluoro-2-butene ($CH_3CF=CHCF_3$);
1,1,1,2,3,4,4,5,5-decafluoro-2-pentene ($CF_3CF=CFCF_2CF_3$);
1,1,2,3,3,4,4,5,5-decafluoro-1-pentene ($CF_2=CFCF_2CF_2CF_3$);
1,1,1,4,4,4-hexafluoro-2-(trifluoromethyl)-2-butene (($CF_3)_2C=CHCF_3$);
1,1,1,2,4,4,5,5-nonafluoro-2-pentene ($CF_3CF=CHCF_2CF_3$);
1,1,1,3,4,4,5,5,5-nonafluoro-2-pentene ($CF_3CH=CFCF_2CF_3$);
1,2,3,3,4,4,5,5,5-nonafluoro-1-pentene ($CHF=CFCF_2CF_2CF_3$);
1,1,3,3,4,4,5,5,5-nonafluoro-1-pentene ($CF_2=CHCF_2CF_2CF_3$);
1,1,2,3,3,4,4,5,5-nonafluoro-1-pentene ($CF_2=CFCF_2CF_2CHF_2$);
1,1,2,3,4,4,5,5,5-nonafluoro-2-pentene ($CHF_2CF=CFCF_2CF_3$);
1,1,1,2,3,4,4,5,5-nonafluoro-2-pentene ($CF_3CF=CFCF_2CHF_2$);
1,1,1,2,3,4,5,5,5-nonafluoro-2-pentene ($CF_3CF=CFCHFCF_3$);
1,2,3,4,4,4-hexafluoro-3-(trifluoromethyl)-1-butene ($CHF=CFCF(CF_3)_2$);
1,1,2,4,4,4-hexafluoro-3-(trifluoromethyl)-1-butene ($CF_2=CFCH(CF_3)_2$);
1,1,1,4,4,4-hexafluoro-2-(trifluoromethyl)-2-butene ($CF_3CH=C(CF_3)_2$);
1,1,3,4,4,4-hexafluoro-3-(trifluoromethyl)-1-butene ($CF_2=CHCF(CF_3)_2$);
2,3,3,4,4,5,5,5-octafluoro-1-pentene ($CH_2=CFCF_2CF_2CF_3$);
1,2,3,3,4,4,5,5-octafluoro-1-pentene ($CHF=CFCF_2CF_2CHF_2$);
3,3,4,4,4-pentafluoro-2-(trifluoromethyl)-1-butene ($CH_2=C(CF_3)CF_2CF_3$);
1,1,4,4,4-pentafluoro-3-(trifluoromethyl)-1-butene ($CF_2=CHCH(CF_3)_2$);
1,3,4,4,4-pentafluoro-3-(trifluoromethyl)-1-butene ($CHF=CHCF(CF_3)_2$);
1,1,4,4,4-pentafluoro-2-(trifluoromethyl)-1-butene ($CF_2=C(CF_3)CH_2CF_3$);
3,4,4,4-tetrafluoro-3-(trifluoromethyl)-1-butene (($CF_3)_2CFCH=CH_2$);
3,3,4,4,5,5,5-heptafluoro-1-pentene ($CF_3CF_2CF_2CH=CH_2$);
2,3,3,4,4,5,5-heptafluoro-1-pentene ($CH_2=CFCF_2CF_2CHF_2$);
1,1,3,3,5,5,5-heptafluoro-1-butene ($CF_2=CHCF_2CH_2CF_3$);

1,1,1,2,4,4,4-heptafluoro-3-methyl-2-butene ($CF_3CF=C(CF_3)(CH_3)$);
2,4,4,4-tetrafluoro-3-(trifluoromethyl)-1-butene ($CH_2=CFCH(CF_3)_2$);
1,4,4,4-tetrafluoro-3-(trifluoromethyl)-1-butene ($CHF=CHCH(CF_3)_2$);
1,1,1,4-tetrafluoro-2-(trifluoromethyl)-2-butene ($CH_2FCH=C(CF_3)_2$);
1,1,1,3-tetrafluoro-2-(trifluoromethyl)-2-butene ($CH_3CF=C(CF_3)_2$);
1,1,1-trifluoro-2-(trifluoromethyl)-2-butene (($CF_3)_2C=CHCH_3$);
3,4,4,5,5,5-hexafluoro-2-pentene ($CF_3CF_2CF=CHCH_3$);
1,1,1,4,4,4-hexafluoro-2-methyl-2-butene ($CF_3C(CH_3)=CHCF_3$);
3,3,4,5,5,5-hexafluoro-1-pentene ($CH_2=CHCF_2CHFCF_3$);
4,4,4-trifluoro-2-(trifluoromethyl)-1-butene ($CH_2=C(CF_3)CH_2CF_3$);
1,1,2,3,3,4,4,5,5,6,6-dodecafluoro-1-hexene ($CF_3(CF_2)_3CF=CF_2$);
1,1,1,2,2,3,4,5,5,6,6,6-dodecafluoro-3-hexene ($CF_3CF_2CF=CFCF_2CF_3$);
1,1,1,4,4,4-hexafluoro-2,3-bis(trifluoromethyl)-2-butene (($CF_3)_2C=C(CF_3)_2$);
1,1,1,2,3,4,5,5,5-nonafluoro-4-(trifluoromethyl)-2-pentene (($CF_3)_2CFCF=CFCF_3$);
1,1,1,4,4,5,5,5-octafluoro-2-(trifluoromethyl)-2-pentene (($CF_3)_2C=CHC_2F_5$);
1,1,1,3,4,5,5,5-octafluoro-4-(trifluoromethyl)-2-pentene (($CF_3)_2CFCF=CHCF_3$);
3,3,4,4,5,5,6,6,6-nonafluoro-1-hexene ($CF_3CF_2CF_2CF_2CH=CH_2$);
4,4,4-trifluoro-3,3-bis(trifluoromethyl)-1-butene ($CH_2=CHC(CF_3)_3$);
1,1,1,4,4,4-hexafluoro-3-methyl-2-(trifluoromethyl)-2-butene (($CF_3)_2C=C(CH_3)(CF_3)$);
2,3,3,5,5,5-hexafluoro-4-(trifluoromethyl)-1-pentene ($CH_2=CFCF_2CH(CF_3)_2$);
1,1,1,2,4,4,5,5,5-nonafluoro-3-methyl-2-pentene ($CF_3CF=C(CH_3)CF_2CF_3$);
1,1,1,5,5,5-hexafluoro-4-(trifluoromethyl)-2-pentene ($CF_3CH=CHCH(CF_3)_2$);
3,4,4,5,5,6,6,6-octafluoro-2-hexene ($CF_3CF_2CF_2CF=CHCH_3$);
3,3,4,4,5,5,6,6-octafluorol-hexene ($CH_2=CHCF_2CF_2CF_2CHF_2$);
1,1,1,4,4-pentafluoro-2-(trifluoromethyl)-2-pentene (($CF_3)_2C=CHCF_2CH_3$);
4,4,5,5,5-pentafluoro-2-(trifluoromethyl)-1-pentene ($CH_2=C(CF_3)CH_2C_2F_5$);
3,3,4,4,5,5,5-heptafluoro-2-methyl-1-pentene ($CF_3CF_2CF_2C(CH_3)=CH_2$);
4,4,5,5,6,6,6-heptafluoro-2-hexene ($CF_3CF_2CF_2CH=CHCH_3$);
4,4,5,5,6,6,6-heptafluoro-1-hexene ($CH_2=CHCH_2CF_2C_2F_5$);
1,1,1,2,2,3,4-heptafluoro-3-hexene ($CF_3CF_2CF=CFC_2H_5$);
4,5,5,5-tetrafluoro-4-(trifluoromethyl)-1-pentene ($CH_2=CHCH_2CF(CF_3)_2$);
1,1,1,2,5,5,5-heptafluoro-4-methyl-2-pentene ($CF_3CF=CHCH(CF_3)(CH_3)$);
1,1,1,3-tetrafluoro-2-(trifluoromethyl)-2-pentene (($CF_3)_2C=CFC_2H_5$);
1,1,1,2,3,4,4,5,5,6,6,7,7,7-tetradecafluoro-2-heptene ($CF_3CF=CFCF_2CF_2C_2F_5$);
1,1,1,2,2,3,4,5,5,6,6,7,7,7-tetradecafluoro-3-heptene ($CF_3CF_2CF=CFCF_2C_2F_5$);
1,1,1,3,4,4,5,5,6,6,7,7,7-tridecafluoro-2-heptene ($CF_3CH=CFCF_2CF_2C_2F_5$);
1,1,1,2,4,4,5,5,6,6,7,7,7-tridecafluoro-2-heptene ($CF_3CF=CHCF_2CF_2C_2F_5$);
1,1,1,2,2,4,5,5,6,6,7,7,7-tridecafluoro-3-heptene ($CF_3CF_2CH=CFCF_2C_2F_5$);
1,1,1,2,2,3,5,5,6,6,7,7,7-tridecafluoro-3-heptene ($CF_3CF_2CF=CHCF_2C_2F_5$);
pentafluoroethyl trifluorovinyl ether ($CF_2=CFOCF_2CF_3$);
trifluoromethyl trifluorovinyl ether ($CF_2=CFOCF_3$) and combinations thereof.

One embodiment of the invention relates to a method of reclaiming refrigerant comprising any combination of the foregoing hydrofluoroolefins, the method comprising:
transferring an unreclaimed refrigerant composition including one or more hydrofluoro olefins, from a source vessel (or equipment) to a treatment vessel;
transporting the receiving vessel to a treatment center;
performing an analysis selected from the group consisting of gas chromatography, mass spectrometry, atomic absorption spectroscopy, flame emission spectroscopy, infra-red spectroscopy, and combinations thereof on the unreclaimed refrigerant composition to determine the composition of the unreclaimed refrigerant composition sample;
determining a target composition, based on the analyzed unreclaimed refrigerant composition;
determining one or more treatments based on the target composition; performing at least one treatment selected from the group consisting of transferring, blending, distillation, nitrogen purging, filtration, dehydration, caustic scrubbing, decanting, and combinations thereof to form a partially reclaimed refrigerant composition or a reclaimed refrigerant composition.

One embodiment of the invention relates to any combination of the foregoing embodiments wherein the composition is the reclaimed refrigerant composition; and wherein the reclaimed refrigerant composition is equal to the target composition.

Another embodiment of the invention relates to any combination of the foregoing embodiments and further comprising:
adding an additive to the reclaimed refrigerant composition;
wherein the additive is present in a concentration less than 0.4 weight percent based on the reclaimed refrigerant composition.

Another embodiment of the invention relates to any combination of the foregoing embodiments wherein the target composition includes at least one primary component and at least one secondary component.

Another embodiment of the invention relates to any combination of the foregoing embodiments wherein the secondary component includes non-condensable material, in a concentration of greater than 1.5 volume percent at 25 degrees Celsius, per AHRI 700.

Another embodiment of the invention relates to any combination of the foregoing embodiments wherein the non-condensable material includes a fluorinated oligomer.

Another embodiment of the invention relates to any combination of the foregoing embodiments wherein the non-condensable material includes an oxidized polyester.

Another embodiment of the invention relates to any combination of the foregoing embodiments wherein the at least one treatment increases a concentration ratio of the at least one primary component to the at least one secondary component, based on the total weight of the unreclaimed refrigerant composition.

Another embodiment of the invention relates to any combination of the foregoing embodiments wherein the treatment includes transferring the unreclaimed refrigerant from the receiving vessel to a treatment vessel.

Another embodiment of the invention relates to any combination of the foregoing embodiments wherein the treatment includes blending and transferring the unreclaimed refrigerant from the receiving vessel to a treatment vessel.

Another embodiment of the invention relates to any combination of the foregoing embodiments wherein the unreclaimed refrigerant composition includes at least one of 2,3,3,3-tetrafluoropropene, trans-1,3,3,3-tetrafluoro-1-propene, trans-1-chloro-3,3,3-trifluoropropene, trans-dichloroethylene, (Z)-1,1,1,4,4,4-hexafluoro-2-butene, 1,1,1,2-tetrafluoroethane, pentafluoroethane, or 1,1-difluoromethane.

Another embodiment of the invention relates to any combination of the foregoing embodiments wherein the unreclaimed refrigerant composition includes at least one of 2,3,3,3-tetrafluoropropene and trans-dichloroethylene, (Z)-1,1,1,4,4,4-hexafluoro-2-butene, 1,1,1,2-tetrafluoroethane, pentafluoroethane, or 1,1-difluoromethane.

Another embodiment of the invention relates to any combination of the foregoing embodiments wherein the unreclaimed refrigerant composition includes an oil.

Another embodiment of the invention relates to any combination of the foregoing embodiments wherein the oil includes a polyolester, polyalkylene glycol or polyvinylether.

Another embodiment of the invention relates to any combination of the foregoing embodiments wherein the one or more treatments include transfer, blending, filtration, and combinations thereof.

Another embodiment of the invention relates to any combination of the foregoing embodiments wherein the unreclaimed refrigerant composition includes at least two immiscible compounds.

Another embodiment of the invention relates to any combination of the foregoing embodiments wherein the treatment includes decanting.

Another embodiment of the invention relates to any combination of the foregoing embodiments wherein the purity of the reclaimed refrigerant composition is greater than 99.5 weight percent, based on the total weight of the refrigerant composition.

Another embodiment of the invention relates to any combination of the foregoing embodiments wherein the one or more treatments includes at least two treatments.

Another embodiment of the invention relates to any combination of the foregoing embodiments wherein the first treatment increases a concentration ratio of the at least one primary component to the at least one secondary component, based on the total weight of the unreclaimed refrigerant composition.

Another embodiment of the invention relates to any combination of the foregoing embodiments wherein the partially reclaimed refrigerant composition is treated with at least one second treatment to form the reclaimed refrigerant composition.

Another embodiment of the invention relates to any combination of the foregoing embodiments wherein the at least one second treatment increases a concentration ratio of the at least one primary component to the at least one secondary component, based on the total weight of the partially reclaimed refrigerant composition.

Another embodiment of the invention relates to any combination of the foregoing embodiments wherein the second treatment includes filtration through a 0.1 micrometer or smaller screen.

Another embodiment of the invention relates to any combination of the foregoing embodiments wherein an oil concentration of the unreclaimed refrigerant composition is reduced by at least 0.5 weight percent, based on the total weight of the unreclaimed refrigerant composition; and
  wherein the oil concentration is reduced to below 0.5 weight percent, based on the total weight of the partially reclaimed refrigerant composition.

Another embodiment of the invention relates to any combination of the foregoing embodiments wherein the second treatment includes dehydration.

Another embodiment of the invention relates to any combination of the foregoing embodiments wherein the unreclaimed refrigerant composition is contacted with a desiccant;
  wherein a water concentration of the unreclaimed refrigerant composition is reduced by at least 0.5 weight percent, based on the total weight of the unreclaimed refrigerant composition; and
  wherein the water concentration is reduced to below 0.5 weight percent, based on the total weight of the partially reclaimed refrigerant composition.

One embodiment of the invention relates to a partially reclaimed refrigerant composition formed by any combination of the foregoing methods.

Another embodiment of the invention relates to any combination of the foregoing embodiments, wherein the first treatment includes transfer or blending.

One embodiment of the invention relates to an apparatus for treating a flammable refrigerant composition, comprising:
  a treatment unit having one or more treatment modules configured to treat the flammable refrigerant composition;
  wherein the flammable refrigerant composition includes a hydrofluoro-olefin; and
  wherein the treatment unit includes one or more of a blending module, a distillation module, a nitrogen purging module, a filtration module, a dehydration module, a caustic scrubbing module, or a decanting module.

Another embodiment of the invention relates to any combination of the foregoing embodiments wherein the hydrofluoro-olefin includes 2,3,3,3-tetrafluoropropene.

Another embodiment of the invention relates to any combination of the foregoing embodiments wherein the one or more treatment modules are electrically grounded.

One embodiment of the invention relates to a method of reclaiming refrigerant, comprising:
  receiving, from a customer, an analysis of an unreclaimed refrigerant composition;
  determining, a target composition, based on the analysis;
  determining, one or more treatments, based on the target composition; dispatching, a mobile treatment unit, including one or more treatment modules, configured to perform the one or more treatments;
  treating, by the mobile treatment unit, the unreclaimed refrigerant composition, to form a reclaimed refrigerant composition, including the target composition;
  wherein the target composition includes at least one of 2,3,3,3-tetrafluoropropene, trans-1,3,3,3-tetrafluoro-1- propene, trans-1-chloro-3,3,3-trifluoropropene, trans-dichloroethylene, (Z)-1,1,1,4,4,4-hexafluoro-2-butene, 1,1,1,2-tetrafluoroethane, pentafluoroethane, or 1,1-difluoromethane.

Another embodiment of the invention relates to any combination of the foregoing embodiments wherein the one or more treatment modules includes one or more of a blending module, a distillation module, a nitrogen purging module, a filtration module, a dehydration module, a caustic scrubbing module, or a decanting module.

Another embodiment of the invention relates to any combination of the foregoing embodiments wherein the one or more treatment modules are electrically grounded.

Another embodiment of the invention relates to any combination of the foregoing embodiments wherein the target composition is at least 99.5 percent pure.

The embodiments of the invention can be used alone or in combinations with each other. Other features and advantages of the present invention will be apparent from the following more detailed descriptions, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION

Provided are methods for recovering, recycling, and reclaiming degraded or used refrigerants. Embodiments of the present disclosure include, for example, recovering a refrigerant composition from a use site, testing the refrigerant composition to determine impurities, modifying the properties of the refrigerant composition above a predetermined threshold, and transferring the refrigerant composition to a use site.

Figure 1:
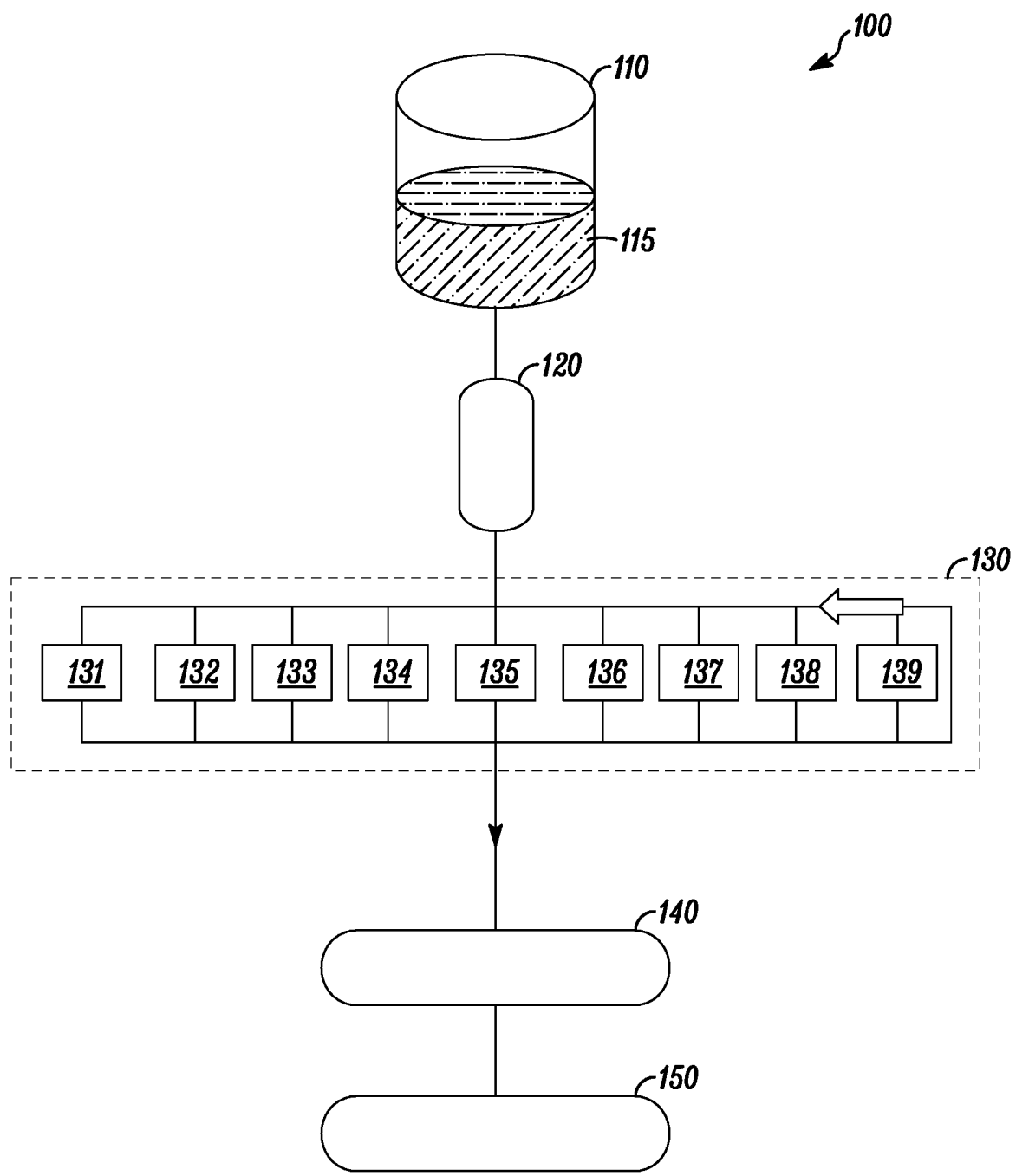
FIG. 1 is a schematic diagram of a refrigerant reclamation system, according to an embodiment.

A refrigerant reclamation system 100, is described in FIG. 1. In the example of FIG. 1, a source tank 110 containing an unreclaimed refrigerant composition 115 is communicatively connected to a receiving tank 120 and configured to allow some or all of the unreclaimed refrigerant composition 115 to be transferred to the receiving tank 120. One or more samples of the unreclaimed refrigerant composition 115 may be collected from the source tank 110 or the receiving tank 120 or a combination thereof. The samples may be analyzed to determine the levels of one or more components in the unreclaimed refrigerant composition 115. The level of the one or more components may result in the unreclaimed refrigerant composition 115 being outside of a desired compositional specification. In some embodiments, the unreclaimed refrigerant composition 115 may be a non-azeotropic composition. In other embodiments, the unclaimed refrigerant composition 115 may be an azeotropic composition.

In some embodiments, the unreclaimed refrigerant composition 115 may include components resulting from polymerization or decomposition of one or more hydrofluoroolefin refrigerants. In some embodiments, the components may include polymers, oligomers, phthalates, adipates, fluorinated hydrocarbons, or other reaction products. In one embodiment, the unreclaimed refrigerant composition may include a homopolymer resulting from the polymerization of one or more refrigerant components of the unreclaimed refrigerant composition 115. In some embodiments, the unreclaimed refrigerant composition 115 may include acid components that may reduce the cycle performance of the unreclaimed refrigerant composition 115. In some embodiments, the unreclaimed refrigerant composition 115 may include chlorine containing or oxidizing species, that may be detrimental to refrigeration system components, such as, hoses, gaskets, or fittings. In some embodiments, the unreclaimed refrigerant composition 115 may include other components, such as, water, oils (e.g., mineral oil or polyolesters), or dyes.

The presence and concentrations of the various components of the unreclaimed refrigerant composition 115 may be analyzed using various analytical techniques, including, gas chromatography, mass spectroscopy, infrared spectroscopy, moisture level, acid level, non-condensable level, high boiling residue and/or color measurement. If the level of the one or more components is outside one or more predetermined thresholds for the components, a treatment plan (or procedure) is determined for the unreclaimed refrigerant composition 115.

The treatment plan includes steps to alter the composition of the unreclaimed refrigerant composition 115 to conform to a target composition. The treatment plan may include one or more treatments of the unreclaimed refrigerant composition 115. In some embodiments, the target composition is a reclaimed refrigerant composition, conforming to the compositional specification, suitable for use in a refrigeration system. In some embodiments, the target composition includes at least one of 2,3,3,3-tetrafluoropropene (HFO-1234yf) or trans-1,3,3,3-tetrafluoro-1-propene (HFO-1234ze(E)). In some embodiments, the target composition includes 2,3,3,3-tetrafluoropropene (HFO-1234yf) or trans-1,3,3,3-tetrafluoro-1-propene (HFO-1234ze(E)) in an amount at least equal to or greater than 99.5 percent of the refrigerant composition.

In some embodiments, one or more of the refrigerants of the unreclaimed refrigerant composition 115 may be a flammable refrigerant. By flammable it is meant, a gas having a flammable range of concentrations in air at 60 degrees Celsius and 101.3 kilopascals pressure per ASTM E-681-09—Standard Test Method for Concentration Limits of Flammability of Chemicals (Vapors and Gases).

Vertical Ton Tank (Vtt)

In one embodiment, an aspect of the process is using a convenient container which enables easy recovery, recycle and reclaim of the used refrigerant. In the exemplary embodiments described herein the container is a 500 L to 1000 L, or more specifically, 750 L to 950 L or more specifically 850 L to 950 L vertical cylinder designed for holding, transferring or conveying a flammable compositions during the recovery, recycle and reclamation and due to the vertical orientation it lends itself to ease of processing of said used refrigerant. It should be noted that any vertical cylinder designed for flammable refrigerants, can also be conveniently used for non-flammable refrigerants. The inventive vertical ton tank (VTT) has specific design parameters, which in the combinations noted below, make it uniquely useful in conjunction with other reclaiming processes mention above. One or more vertical ton tanks may be used in the refrigeration distribution system 100 in various roles, including as the source tank 110 and/or receiving tank 120.

Orientation

The VTT cylinder is designed such that the pressure vessel is vertically oriented which implies that the cylinder is upright (vertical) during use, transport and storage. The specific orientation lends towards smaller physical footprint at a potential recovery location as footprint (m2) may be limited near a recovery/recycle/recharge (R/R/R) operation. Additionally, the vertical orientation design lends itself favorably towards the actual conveyance of the vertical ton tank. The vertical ton tank can be conveniently loaded onto a forklift without any loss of gravity or unusual positioning as is the case with the horizontal ton tank. The design of the base of the vertical ton tank is also designed to improve product conveyance. In one design option, the bottom of the vertical ton tank has an integrated pallet with openings for the fork lift tines. Therefore, the described VTT can safely and conveniently be used to physically move flammable refrigerants to a remote recovery processing location.

Depending on the refrigerant being used in the R/R/R process, the pressure, flammability and volume will follow the appropriate design codes. In the United States, for example, the vertical ton tank will follow the ASME design construction and pressure rating, while in the EU the vertical ton tank will follow ADR and in Japan the vertical ton tank will follow HPGL.

Dip Tube Orientation

Figure 4:
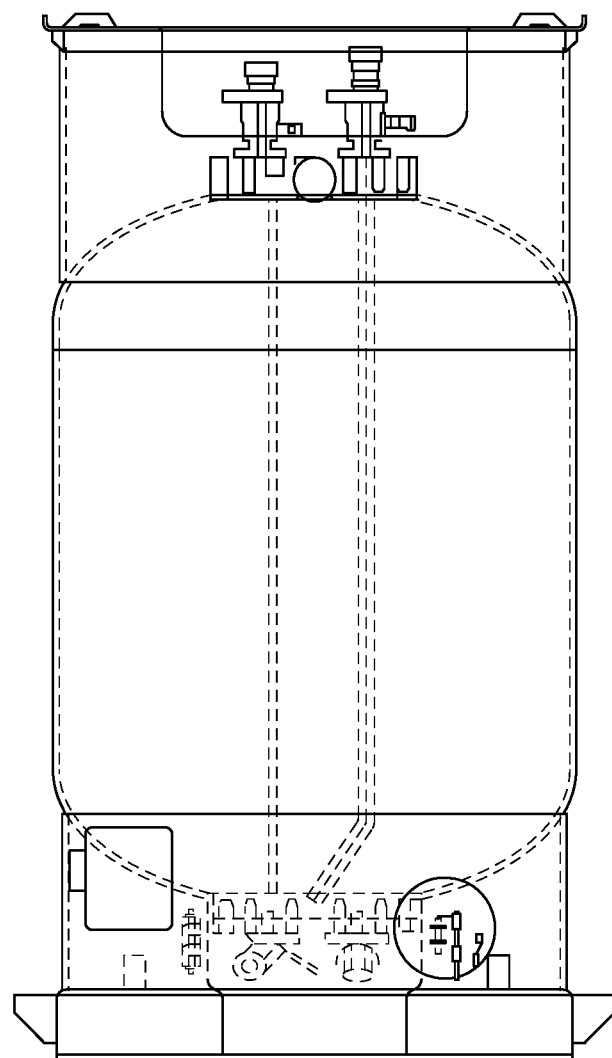
FIG. 4 is a front view of a vertical ton tank, according to an embodiment.
Figure 5:
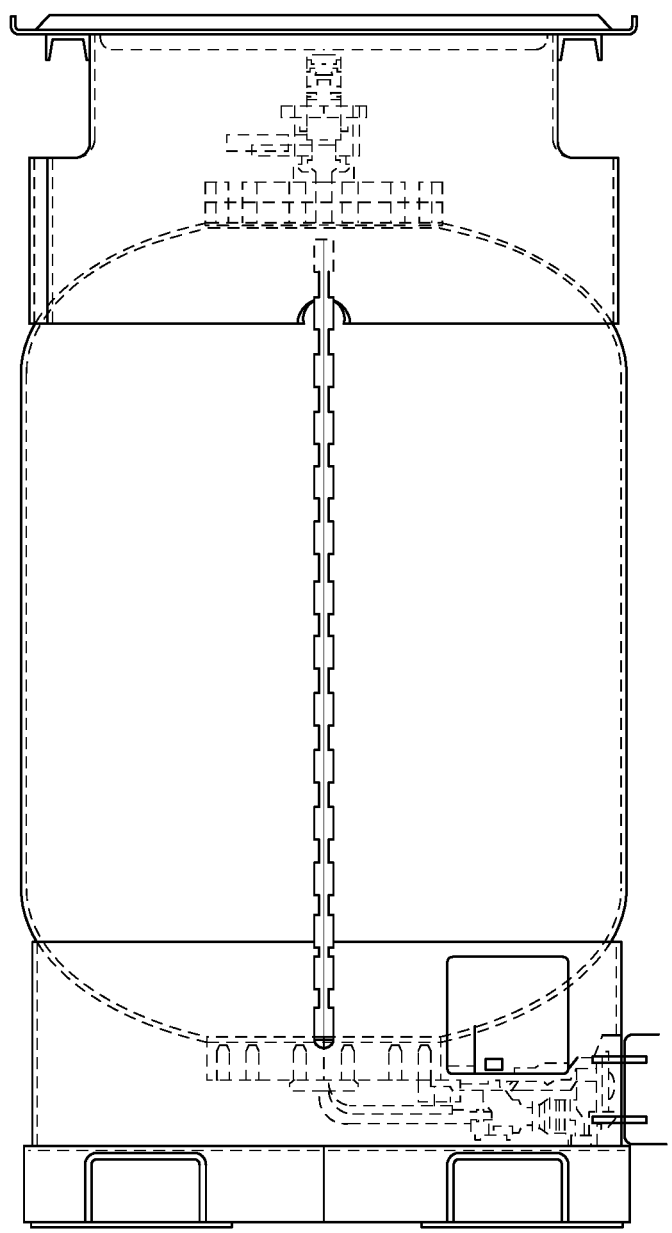
FIG. 5 is a side view of a vertical ton tank, according to an embodiment.

Another embodiment of the improved VTT are the locations and orientation of the dip tubes. While dip tubes are basic to cylinder design the combination of the location of the dips tubes with the flanges and orientation of the dip tubes to meet the upper and lower flanges as described in the next section provide unique product conveyance for R/R/R of used refrigerant. FIGS. 4 and 5 show a front and side view of an embodiment of the vertical ton tank (VTT) with dip tubes. Dip tubes 62 and 65 are shown with 12 inch and 1 inch connections at the top and bottom of the tank. The attachments of dip tubes 62 ad 65 to top flange 60 and bottom flange 61 is also pictured. Items to note are #62 and #65 for dip tube orientation and how that mates with the top and bottom flange.

Bottom and Top Flanges

Another embodiment of the utility of the re-designed VTT are the additions and locations of flanges which also aid in the R/R/R process. While process refrigerant can be conveyed from VTT to another VTT or a separate storage container, it may be desirable to be able to get into the VTT to review what residues are left in said VTT. Therefore, the VTT has been designed to include two larger flanges marked as (top flange 60) and (bottom flange 61). The bottom and top flanges aid in opening the VTT tanks and taking visual inspection or easy inspection with a scoping process, such as a boroscope. The flanges also aid in easy removal of any debris that could collect from the used refrigerant impurities. The flanges are shown in FIGS. 4 and 5.

Piping from Flanges to Valves

Figure 6A:
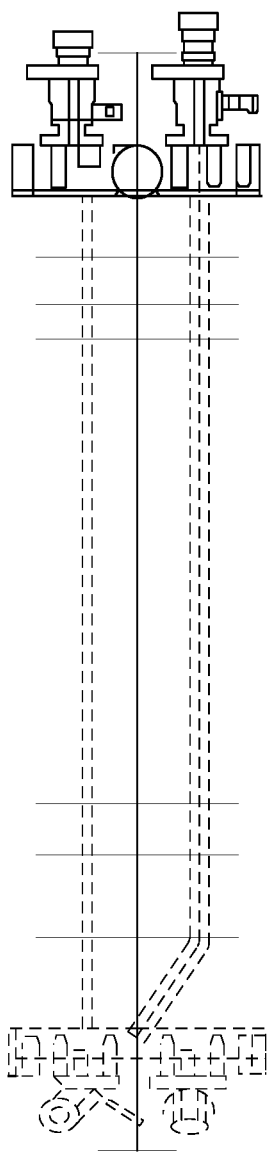
FIG. 6A is an expanded front view of the internal piping of the vertical ton tank, according to an embodiment.
Figure 6B:
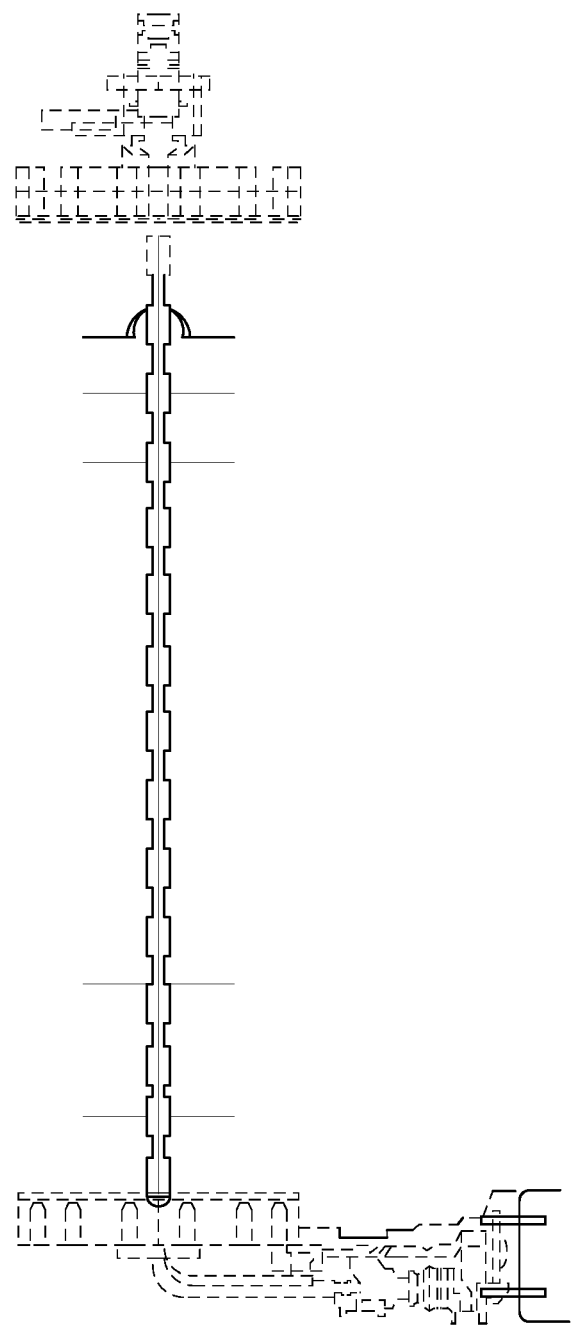
FIG. 6B is an expanded side view of the internal piping of the vertical ton tank, according to an embodiment.

Another embodiment in the re-designed VTT is the location and design piping/connections from the flanges to the valves. As can be seen from the diagram, the bottom flange has both larger and smaller drain pipe coming from the flange. FIG. 6 illustrates the location and orientation of the drain pipes.

Figure 7:
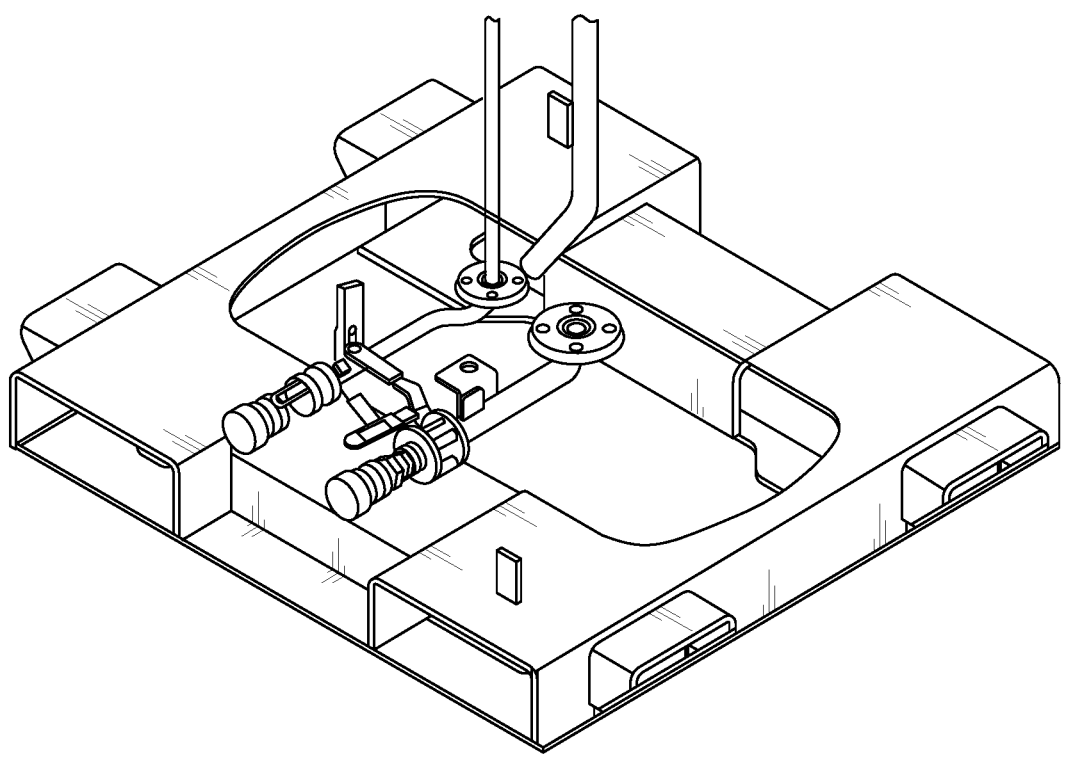
FIG. 7 shows the piping couplers of the vertical ton tank, according to an embodiment.
Figure 8:
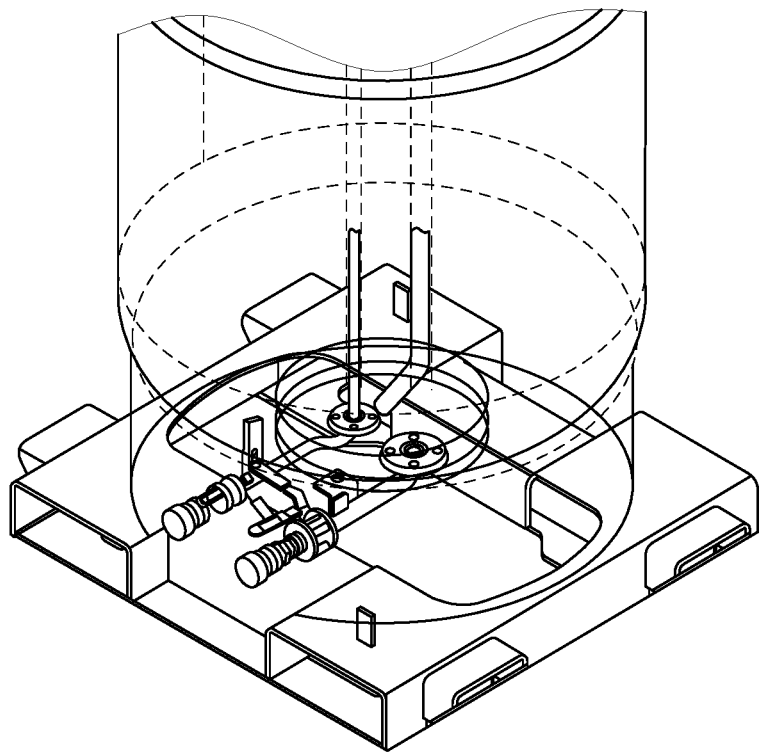
FIG. 8 is a view of the bottom portion of a vertical ton tank, according to an embodiment.

FIGS. 7 and 8 are expanded top and side views of the bottom portion of the (VTT). These diagrams show elements in more detail and how they configure into the main bottom flange. The smaller piping details are given in elements 83, 84, 85 (smaller flange) which connects to ½' pipe 64 which then leads out to a connector. The larger piping details are given in elements 87, 88, and 89 which connects to 1' pipe 63.

| PARTS LIST | |
|---|---|
| 86 | Goujon M20-55, bm 30 acier/Stud/carbon steel/42CrMo4 EN 10269 |
| 85 | Ecrou HH, M12 acier/Nut/carbon steel/25CrMo4 EN 10269 |
| 84 | Rondelle M12 acier zingué/Washer M12/galvanized carbon steel |
| 83 | Goujon M12-40, bm 18 acier/Stud/carbon steel/25CrMo4 EN 10269 |
| 82 | Ecrou HH, M20 acier/Nut HH, M20/carbon steel/42CrMo4 EN 10269 |
| 81 | Rondelle M20 acier zingué/Washer M 20 galvanized carbon steel |
| 80 | Goujon M20-60, bm 30 acier/Stud/carbon steel/42CrMo4 EN 10269 |
| 69 | Bride PN50 DN15 1.4404 EN 10222-5 ou EN 10272 Flange PN50 DN 15 1.4404 EN 10222-5 ou EN 10272 |
| 68 | Bride PN50 DN25 1.4404 EN 10222-5 ou EN 10272 Flange PN50 DN 251.4404 EN 10222-5 ou EN 10272 |
| 64-65 | Tube Ø21.3 x 3.6 (1/2") départ gaz externe/inox 1.4404 EN 10216-5 (316L) Pipe service gaz 1/2"x3.6 Stainless steel 1.4404 EN 10216-5 |
| 62-63 | Tube Ø33.4 x 4.5 (1") reprise liquid inox 1.4404 EN 10216-5 (316L) 1" Liquid outlet pipe tck 3.6 SS 1.4404 EN 10216-5 (316L) |
| 61 | Trou de visite DN295 P355NL1 EN 10028-3/Visiting hole ND295 P355 NL1 |
| 60 | Trou de visite DN295 P355NL1 EN 10028-3/Visiting hole ND295 P355 NL1 |
| 27-29 | Plats support tuyauterie acier S235 JO/support flats acier S235 J0 EN 10025 |
| 26-28 | Plat support tuyauterie inox 1.4404/support flat stainless steel 1.4404 EN10028-7 |
| 138 | Rondelle M8 inox auténitique/washer M8 stainless steel |
| 137 | Robinet Male/Male 1/2" NPT MECA INOX/Ball valve 1/2" NPT MECA INOX |
| 136 | Robinet Male/Male 1" NPT MECA INOX/Ball valve 1" NPT MECA INOX |
| 135 | Ecrou H, M8 inox auténitique/Nut M8 x 30 stainless steel |
| 134 | Vis M 8x30 inox auténitique/screw M8 x 30 stainless steel |
| 133 | Goujon H, M12-40 bm 18, 25CrMo4 EN 10269/Stud M12-40 bm 18 25CrMo4 EN 10269 |
| 132 | Joint plat Ø 40x30x 2 PTFE/Gasket plat 40x30x2 PTFE |
| 131 | Joint plat Ø 323x305x 3 PTFE/Gasket plat 323x305x3 PTFE |
| 130 | Joint plat Ø 51x38x2x PTFE/Gasket plat 57x43x2 PTFE |
| 127 | Protecteur conique des robinets @ 80/protective adaptor W80 for valves |
| 126 | Mamelon 1" NPT inox 316L/adaptor 1" NPT 316L |
| 125 | Caps de protection palstique raccord TODO/plastic protection for TODO adaptor |
| 124 | Raccord (TODO tank units) 1" NPT/coupling (TODO tank units) 1" NPT |

-continued

PARTS LIST

| | |
|---|---|
| 123 | Mamelon 1/2" NPT/adaptor 1/2" NPT |
| 122 | Raccord (TODO tank units) 1/2" NPT/coupling (TODO tank units) |
| 121 | Robinet Female/Female 1" NPT MECA INOX/Ball valve 1" NPT<br>1/2" NPT MECA INOX |
| 120 | Robinet Female/Female 1/2" NPT MECA INOX/Ball valve 1/2" NPT MECA INOX |

Gaskets

Another design element is the addition of PTFE gaskets as shown which ensure that no additional contamination comes from gaskets. PTFE gaskets have been found to innocuous with HFO type products and therefore need to be used in combination with this design.

Valves

Another unique design element is the addition of dry bulk couplers (DBC) which limit the amount of refrigerant that can be released during refrigerant transfer. Dry bulk couplers have a specific locking mechanism which stops product transfer until the unlocking mechanism is engaged. After the unlocking mechanism is engaged, product is transferred. This mechanism reduces release of flammable products down to less than 1 gram and is very desireable in this VTT design. The DBC also aids in the sustainable conveyance of refrigerants as typically less than a gram of refrigerant is released during the coupling and uncoupling of the DBC. The combination of the DBC to this process aids in ease of product transfer, increases safety and limits and any unintentional exposure of refrigerant and/or contaminant. These are elements 122, 124 and 125 in the drawing. Adaptors from the metal piping to the DBC are element 123. DBC brands are commonly known as Denver Gardner TODO, Econosto valves, and Dixon valves.

Bottom Collar

The specifically designed VTT has a bottom collar that latches in place to protect the bottom valves associated with VTT. The collar keeps the forklift tines from potentially hitting the lower valves and/or flanges and therefore protects product. In addition, the bottom collar can be zip tied to aid in anti-counterfeit detection. Any braking of a certified zip lock can indicate that the product has been potentially tampered with.

Figure 9:
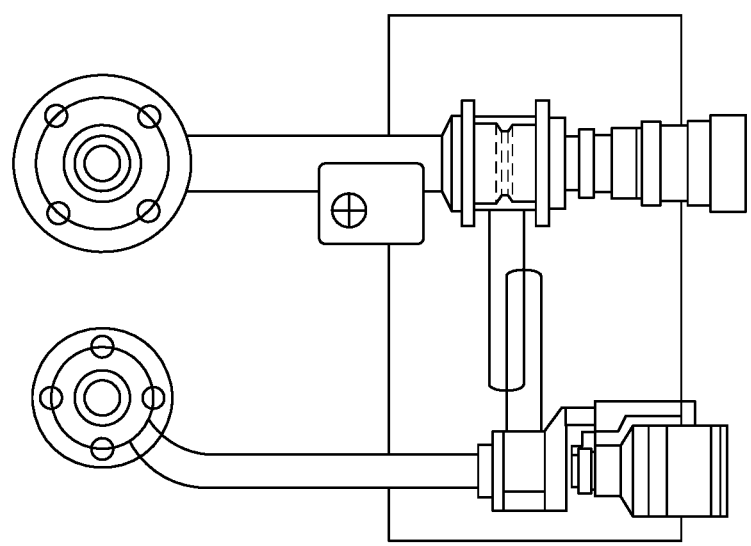
FIG. 9 is an expanded top view of the valve configuration of a vertical ton tank, according to an embodiment.
Figure 10:
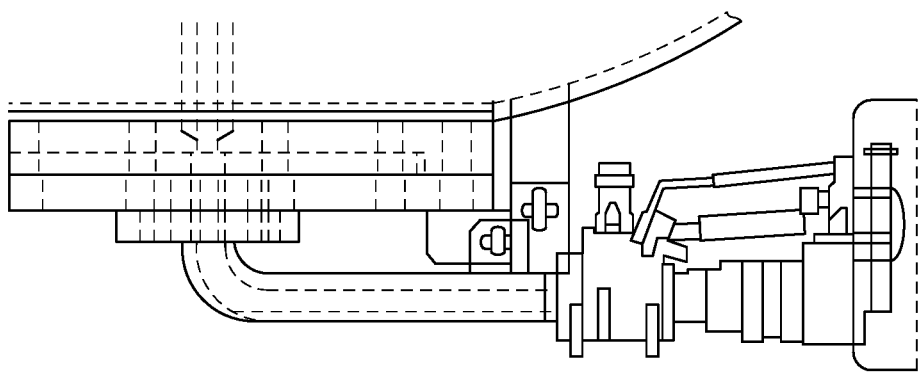
FIG. 10 is an expanded side view of the valve configuration of a vertical ton tank, according to an embodiment.
Figure 11:
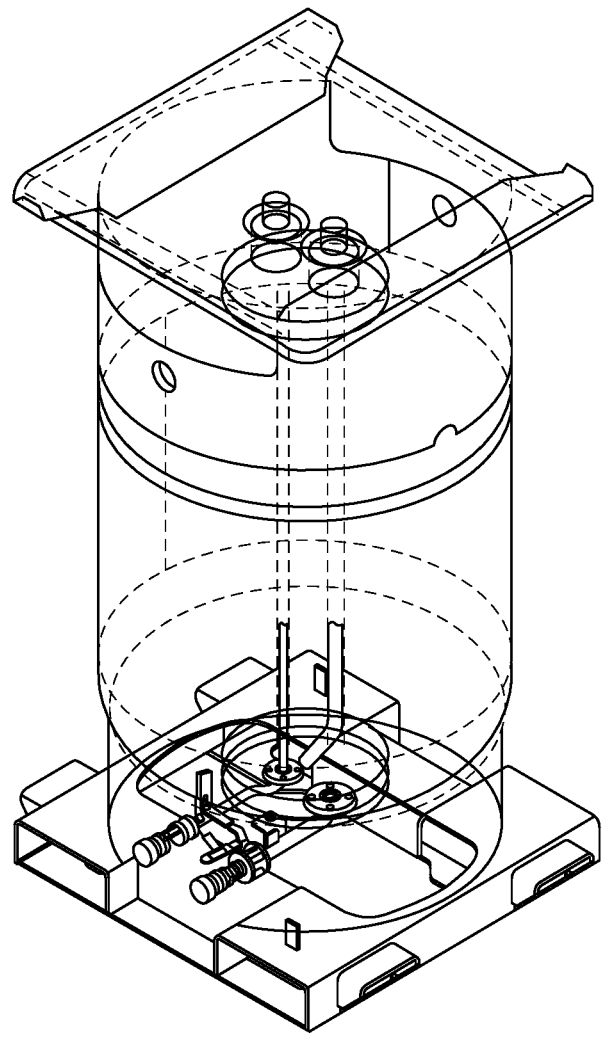
FIG. 11 is a view of a vertical ton tank having a bottom protective collar, according to an embodiment.
Figure 12:
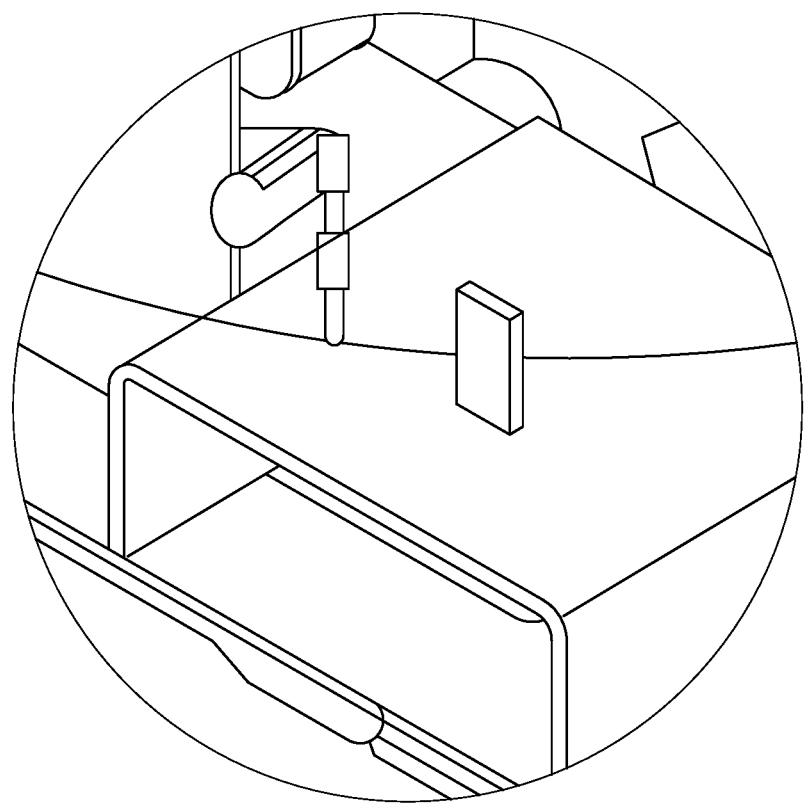
FIG. 12 shows a door as part of bottom protective collar of a vertical ton tank, according to an embodiment.

See FIG. 9 for an illustration how the collar fits over the valves. FIG. 10 shows protective door which may further protect the valves when the tank is not connected externally.

In the example of FIG. 1, the unreclaimed refrigerant composition 115 may be transferred from the receiving tank 120 to a treatment unit 130. The treatment unit 130 includes one or more treatment modules that act on the unreclaimed refrigerant composition 115 to reduce the concentration of the one or more unreclaimed refrigerant composition 115 components below the one or more predetermined thresholds in the unreclaimed refrigerant composition 115. In some embodiments, the unreclaimed refrigerant composition 115 may be treated with a first treatment to form a partially reclaimed refrigerant composition.

In an embodiment, the treatment unit 130 includes a blending module 131. The blending module 131 adds a composition to the unreclaimed refrigerant composition 115 or partially reclaimed refrigerant composition to alter the concentration of the one or more components. The alteration may result in the concentration of the one or more components being altered to less than the one or more predetermined thresholds in the unreclaimed refrigerant composition 115. In some embodiments, the purity of the reclaimed refrigerant composition will be greater than 99.5 weight percent, based on the total weight of the refrigerant composition.

In an embodiment, the treatment unit 130 includes a transfer module 132. The transfer module 132 transfers at least a portion of the unreclaimed refrigerant composition 115 or partially reclaimed refrigerant composition to a reclamation tank. The transfer of the refrigerant composition results in the alteration of the concentration of one or more components of the unreclaimed refrigerant composition 115. In some embodiments, the transfer partially fills the reclamation tank.

In some embodiments, the method for filling a refrigerant mixture including a non-azeotropic (or azeotropic) refrigerant to a reclamation tank includes adjusting the proportion at least one component of the refrigerant composition in the liquid phase of the refrigerant mixture prior to the transfer, to a specific range. In some embodiments, the refrigerant composition may be treated by the blending module 131, prior to treatment by the transfer module 132.

The mixture ratio is described below in terms of a partially reclaimed refrigerant composition or an unreclaimed refrigerant composition 115 before being transferred to a reclamation vessel, from a refrigerant composition source, that is filled with the refrigerant composition in an amount less than 100 wt % of a maximum filling amount of the refrigerant mixture.

The term "maximum filling amount" (100 wt % of the maximum filling amount) used herein refers to a maximum amount that can be filled into a container, as defined by regulating bodies, such as, the US Department of Transportation (US DOT), the European Union ADR, the European Agreement concerning the International Carriage of Dangerous Goods by Road (ADR), and the High Pressure Gas Safety Act of Japan. According to these transportation regulations, the maximum filling amount is calculated as below:

$G=V/C$

G: Mass (kg) of fluorocarbon

V: Capacity (L) of the container

C: Constant according to the type of fluorocarbon being filled into container and temperature or pressure limit as defined in the regulations.

As the unreclaimed refrigerant composition 115 partially fills the reclamation vessel, a portion of each of the component vaporizes to fill the remaining space within the reclamation vessel. For a non-azeotropic composition, the relative proportion of lower boiling components in the vapor is greater than the proportion of the lower boiling components in the liquid unreclaimed refrigerant composition 115. Thus, the proportion of the lower boiling components relative to the higher boiling components of the liquid unreclaimed refrigerant composition is altered by the transfer.

In some embodiments, the target composition includes a non-azeotropic composition. In some embodiments, the target composition includes at least one primary component. The unreclaimed refrigerant composition 115 may include at least one secondary component in addition to the at least one primary component. In some embodiments, the at least one primary component is a desired material of the target composition. In some embodiments, the at least one secondary component is an undesired component of the target composition. In some embodiments, the at least one secondary component may exhibit a lower boiling point than the at least one primary component. During treatment by the transfer module 132 a ratio of the at least one primary component to the at least one secondary component may be increased, based on the liquid unreclaimed refrigerant composition 115.

In an embodiment, the treatment unit 130 includes a decanting module 133. The decanting module 133 may separate one or more immiscible materials from the partially reclaimed refrigerant composition or the unreclaimed refrigerant composition 115. For example, the decanting module 133 may separate a plurality of immiscible liquids by pumping and/or draining one or more of the liquids out of the decanting module 132. In one embodiment, the separated liquid is an impurity, thus it is separated from the unreclaimed refrigerant composition 115 remaining in the decanting module 133. In one embodiment, the separated liquid may include the desired refrigerant composition, thus separating the desired material from one or more impurities remaining in the decanting module 132. The decanting may result in the concentration of the one or more components being altered to less than the one or more predetermined thresholds in the unreclaimed refrigerant composition 115. In one embodiment, a ratio of the at least one primary component to the at least one secondary component may be increased, based on the liquid unreclaimed refrigerant composition 115. In some embodiments, the concentration of non-condensable materials may be altered, resulting in a concentration of less than 1.5 volume percent at 25 degrees Celsius, per AHRI 700 (Air-Conditioning, Heating, and Refrigeration Institute standard, "Specifications for Fluorocarbon Refrigerants", AHRI 700, September 2016). In some embodiments, the purity of the reclaimed refrigerant composition will be greater than 99.5 weight percent, based on the total weight of the refrigerant composition.

In an embodiment, the treatment unit 130 includes a distillation module 133. The distillation module 134 may separate one or more materials from the partially reclaimed refrigerant composition or the unreclaimed refrigerant composition 115. For example, the distillation module 134 may separate one or more impurities from the unreclaimed refrigerant composition 115 by distilling one or more of the materials out of the distillation module 134. In one embodiment, the separated material is an impurity, thus it is separated from the unreclaimed refrigerant composition 115 remaining in the distillation module 134. In one embodiment, the separated material may include the desired refrigerant composition, thus separating the desired material from one or more impurities remaining in the distillation module 134. The distillation may result in the concentration of the one or more components being altered to less than the one or more predetermined thresholds in the unreclaimed refrigerant composition 115. In one embodiment, a ratio of the at least one primary component to the at least one secondary component may be increased, based on the liquid unreclaimed refrigerant composition 115. In some embodiments, the concentration of non-condensable materials may be altered, resulting in a concentration of less than 1.5 volume percent at 25 degrees Celsius, per AHRI 700. In some embodiments, the purity of the reclaimed refrigerant composition will be greater than 99.5 weight percent, based on the total weight of the refrigerant composition.

In an embodiment, the treatment unit 130 includes a filtration module 135. The filtration module 135 may separate one or more insoluble particulates from the partially reclaimed refrigerant composition or the unreclaimed refrigerant composition 115. For example, the filtration module 135 may separate a plurality of insoluble particles from the unreclaimed refrigerant composition 115 by filtration. In some embodiments, the unreclaimed refrigerant composition 115 is filtered through an at least 0.01 micrometer screen, an at least 0.03 micrometer screen, an at least 0.05 micrometer screen, an at least 0.08 micrometer screen, an at least 0.1 micrometer screen, or an at least 0.15 micrometer screen. In one embodiment, the unreclaimed refrigerant composition 115 is filtered through a 0.1 micrometer screen. The filtration may result in the concentration of the one or more components being altered to less than the one or more predetermined thresholds in the unreclaimed refrigerant composition 115. In one embodiment, a ratio of the at least one primary component to the at least one secondary component may be increased, based on the liquid unreclaimed refrigerant composition 115. In one embodiment, the concentration of the one or more components may be altered resulting in an oil concentration of below 0.5 weight percent, but preferably below 0.05 weight percent, and even more preferably below 0.0025 weight percent, below 22 parts per million (ppm) by weight. In one embodiment, the concentration of the one or more components may be altered resulting in a reduction in the concentration of dyes. In one embodiment, the color of the unreclaimed refrigerant composition 115 is altered to a Gardner color value of less than 3.

In an embodiment, the treatment unit 130 includes a scrubbing module 136. The scrubbing module 136 may treat the unreclaimed refrigerant composition 115 by contacting the unreclaimed refrigerant composition 115 with a treatment composition. In some embodiments, the treatment composition may be a caustic/basic scrubber. For example, the scrubbing module 136 may contact the unreclaimed refrigerant composition 115 with a caustic solution to remove components including an acid moiety. In one embodiment, the unreclaimed refrigerant composition 115 is contacted with an aqueous sodium hydroxide solution using a venturi scrubber. The scrubbing may result in the concentration of the one or more components being altered to less than the one or more predetermined thresholds in the unreclaimed refrigerant composition 115. In one embodiment, the concentration of the one or more components may be altered resulting in a total acid number (TAN) of less than 2 milligrams KOH per 2 grams of the unreclaimed refrigerant composition 115. In one embodiment, the concentration of the one or more components may be altered resulting in an acidity level of less than 1 ppm by weight as HCl, per AHRI 700. In some embodiments, the resulting scrubbed unreclaimed refrigerant composition 115 may be further collected and dried to remove any residual water.

In an embodiment, the treatment unit 130 includes a dehydration module 137. The dehydration module 137 may be used to remove water from the unreclaimed refrigerant composition 115. For example, the dehydration module 137 may contact the unreclaimed refrigerant composition 115 with a desiccant, such as molecular sieves. The dehydration may result in the concentration of the one or more impurities being reduced to less than the one or more predetermined thresholds in the unreclaimed refrigerant composition 115. In one embodiment, the scrubbed unreclaimed refrigerant composition 115 may be dehydrated by passing the scrubbed unreclaimed refrigerant composition 115 through the dehydration module 137. In some embodiments, the moisture concentration may be altered, resulting in a moisture level of less than 20 ppm by weight, per AHRI 700. In one embodiment, the moisture concentration may be altered, resulting in a moisture level of less than 10 ppm by weight, per AHRI 700 or to moisture levels less than 5 ppm by weight per AHRI 700.

In an embodiment, the treatment unit 130 includes an inert gas purge module 138. The inert gas purge module 138 may contact the unreclaimed refrigerant composition 115 with an inert gas, such as nitrogen, argon, or xenon, to displace dissolved reactive gases in the unreclaimed refrigerant composition 115. In one embodiment, the inert gas may include dry nitrogen. The inert gas purge may result in the concentration of the one or more components being altered to less than the one or more predetermined thresholds in the unreclaimed refrigerant composition 115. In one embodiment, the concentration of non-condensable gases (NCG) or non-absorbable gases (NAG) may be altered, resulting in a concentration of less than 1.5 volume percent at 25 degrees Celsius, per AHRI 700, preferably below 0.9 volume percent at 25 degrees Celsius per AHRI 700. NAG typically comprise air, (which is typically comprised of 78% nitrogen, 21% oxygen, and about 1% argon), accumulated in the vapor phase of refrigerants where the solubility of air in the refrigerant liquid phase is extremely low. While reducing the total amount of NAG contained within said refrigerant may be important, it is typically more desirable to reduce the oxygen containing portion of the NAG preferentially over the nitrogen portion. The oxygen containing portion, under certain scenarios, may increase the propensity of the refrigerant to decompose or form unwanted polymeric materials.

In an embodiment, the treatment unit 130 includes a non-absorbale gas (NAG) reduction unit139.

The NAG reduction unit 139 may contact the unreclaimed refrigerant composition with a reducing agent, such as a metal powder, which may react with oxygen or other oxidizable components of the unreclaimed refrigerant composition. In one embodiment, the reducing agent may include iron powder. Treatment by the NAG reduction unit 139 may result in the concentration of one or components of the unreclaimed refrigerant composition being reduced to less than one or more predetermined thresholds in the unreclaimed refrigerant composition. In one embodiment, the concentration of non-condensable materials may be altered, resulting in a concentration of less than 1.5 volume percent at 25 degrees Celsius, per AHRI 700, preferably below 0.9 volume percent at 25 degrees Celsius per AHRI 700.

In another embodiment, a condenser is used in conjunction with a cooling medium that is sufficiently cold enough to condense the refrigerant and let the NAGs pass through with minimal loss of refrigerant. A compressor can be used in conjunction with the condenser to increase the pressure and make it easier to condense the refrigerant at a higher temperature.

And in even another embodiment, a membrane is placed such that the NAGs can pass through the membrane and are removed while the refrigerant does not pass through, therefore the NAGs are separated from the refrigerant.

The modules of treatment unit 130 may be used alone or in combination. The unreclaimed refrigerant composition 115 may be treated by any of the modules of treatment unit 130 one or more times. The one or more treatments by the one or more modules of treatment unit 130 may result in the unreclaimed refrigerant composition 115 becoming a reclaimed refrigerant composition with all the concentrations of the one or more impurities being reduced to less than the one or more predetermined thresholds. In some embodiments, the reclaimed refrigerant composition will exhibit impurity levels equivalent to virgin material. In some embodiments, the purity of the reclaimed refrigerant composition will be greater than 99.5 weight percent, based on the total weight of the refrigerant composition. In some embodiments, the purity of the reclaimed refrigerant composition will be greater than 99.7 weight percent, based on the total weight of the refrigerant composition. In some embodiments, the purity of the reclaimed refrigerant composition will be greater than 99.9 weight percent, based on the total weight of the refrigerant composition.

As shown in FIG. 1, the reclaimed refrigerant composition may be transferred from the treatment unit 130 to a use tank 140. The use tank 140 may include both reclaimed and virgin material. The use tank 140 may be directly connected to a refrigeration system and configured to the supply the refrigeration system with refrigerant. Alternatively, the use tank 140 may be connected to a distribution tank 150. The use tank 140 may supply the, typically smaller, distribution tank 150 with refrigerant. After which, the distribution tank 150 may be transported to a use site and used to supply a refrigeration system or customer storage tank with refrigerant. In some embodiments, the purity of the refrigerant composition of the use tank 140 or distribution tank 150 will be greater than 99.5 weight percent, based on the total weight of the refrigerant composition. In some embodiments, the purity of the refrigerant composition of the use tank 140 or distribution tank 150 will be greater than 99.7 weight percent, based on the total weight of the refrigerant composition. In some embodiments, the purity of the refrigerant composition of the use tank 140 or distribution tank 150 will be greater than 99.9 weight percent, based on the total weight of the refrigerant composition.

In some embodiments, an additive may be added to the reclaimed refrigerant composition. In one embodiment, the additive is present in a concentration less than 0.4 weight percent based on the reclaimed refrigerant composition. In one embodiment, the additive may include an inhibitor. In one embodiment, the inhibitor may include at least one of limomene, a-terpinene, α-tocopherol, butylated hydroxytoluene, 4-methoxyphenol, or benzene 1,4-diol. In one embodiment, the inhibitor includes a material having a melting point at a temperature from −70 to 180 degrees Celsius.

In some embodiments, the reclaimed refrigerant composition may include one or more optional non-refrigerant components selected from the group consisting of lubricants, dyes (including UV dyes), solubilizing agents, compatibilizers, stabilizers, tracers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof. In some embodiments, the optional non-refrigerant components may be referred to as additives. Indeed, many of these optional non-refrigerant components fit into one or more of these categories and may have qualities that lend themselves to achieve one or more performance characteristic.

In some embodiments, one or more non-refrigerant components are present in small amounts relative to the overall composition. In some embodiments, the amount of additive(s) concentration in the disclosed compositions is from less than about 0.1 weight percent to as much as about 5 weight percent of the total composition. In some embodiments of the present invention, the additives are present in the disclosed compositions in an amount between about 0.1 weight percent to about 5 weight percent of the total composition or in an amount between about 0.1 weight percent to about 3.5 weight percent. In one embodiment, the additive is present in a concentration less than 0.4 weight percent based on the reclaimed refrigerant composition. The additive component(s) selected for the disclosed composition is selected on the basis of the utility and/or individual equipment components or the system requirements.

In one embodiment, the lubricant is selected from the group consisting of mineral oil, alkylbenzene, polyol esters, polyalkylene glycols, polyvinyl ethers, polycarbonates, perfluoropolyethers, silicones, silicate esters, phosphate esters, paraffins, naphthenes, polyalpha-olefins, and combinations thereof.

The lubricants as disclosed herein may be commercially available lubricants. For instance, the lubricant may be paraffinic mineral oil, sold by BVA Oils as BVM 100 N, naphthenic mineral oils sold by Crompton Co. under the trademarks Suniso® 1GS, Suniso® 3GS and Suniso® 5GS, naphthenic mineral oil sold by Pennzoil under the trademark Sontex® 372LT, naphthenic mineral oil sold by Calumet Lubricants under the trademark Calumet® RO-30, linear alkylbenzenes sold by Shrieve Chemicals under the trademarks Zerol® 75, Zerol® 150 and Zerol® 500 and branched alkylbenzene sold by Nippon Oil as HAB 22, polyol esters (POEs) sold under the trademark Castrol® 100 by Castrol, United Kingdom, polyalkylene glycols (PAGs) such as RL-488A from Dow (Dow Chemical, Midland, Michigan), and mixtures thereof, meaning mixtures of any of the lubricants disclosed in this paragraph.

In the compositions of the present invention including a lubricant, the lubricant is present in an amount of less than 40.0 weight percent to the total composition. In other embodiments, the amount of lubricant is less than 20 weight percent of the total composition. In other embodiments, the amount of lubricant is less than 10 weight percent of the total composition. In other embodiments, the about of lubricant is between about 0.1 and 5.0 weight percent of the total composition.

Notwithstanding the above weight ratios for compositions disclosed herein, it is understood that in some heat transfer systems, while the composition is being used, it may acquire additional lubricant from one or more equipment components of such heat transfer system. For example, in some refrigeration, air conditioning and heat pump systems, lubricants may be charged in the compressor and/or the compressor lubricant sump. Such lubricant would be in addition to any lubricant additive present in the refrigerant in such a system. In use, the refrigerant composition when in the compressor may pick up an amount of the equipment lubricant to change the refrigerant-lubricant composition from the starting ratio.

The non-refrigerant component used with the compositions of the present invention may include at least one dye. The dye may be at least one ultra-violet (UV) dye. The UV dye may be a fluorescent dye. The fluorescent dye may be selected from the group consisting of naphthalimides, perylenes, coumarins, anthracenes, phenanthracenes, xanthenes, thioxanthenes, naphthoxanthenes, fluoresceins, and derivatives of said dye, and combinations thereof, meaning mixtures of any of the foregoing dyes or their derivatives disclosed in this paragraph.

In some embodiments, the disclosed compositions contain from about 0.001 weight percent to about 1.0 weight percent UV dye. In other embodiments, the UV dye is present in an amount of from about 0.005 weight percent to about 0.5 weight percent; and in other embodiments, the UV dye is present in an amount of from 0.01 weight percent to about 0.25 weight percent of the total composition.

UV dye is a useful component for detecting leaks of the composition by permitting one to observe the fluorescence of the dye at or in the vicinity of a leak point in an apparatus (e.g., refrigeration unit, air-conditioner or heat pump). The UV emission, e.g., fluorescence from the dye may be observed under an ultra-violet light. Therefore, if a composition containing such a UV dye is leaking from a given point in an apparatus, the fluorescence can be detected at the leak point, or in the vicinity of the leak point.

Another non-refrigerant component which may be used with the compositions of the present invention may include at least one solubilizing agent selected to improve the solubility of one or more dye in the disclosed compositions. In some embodiments, the weight ratio of dye to solubilizing agent ranges from about 99:1 to about 1:1. The solubilizing agents include at least one compound selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers and 1,1,1-trifluoroalkanes and mixtures thereof, meaning mixtures of any of the solubilizing agents disclosed in this paragraph.

In some embodiments, the non-refrigerant component comprises at least one compatibilizer to improve the compatibility of one or more lubricants with the disclosed compositions. The compatibilizer may be selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers, 1,1,1-trifluoroalkanes, and mixtures thereof, meaning mixtures of any of the compatibilizers disclosed in this paragraph.

The solubilizing agent and/or compatibilizer may be selected from the group consisting of hydrocarbon ethers consisting of the ethers containing only carbon, hydrogen and oxygen, such as dimethyl ether (DME) and mixtures thereof, meaning mixtures of any of the hydrocarbon ethers disclosed in this paragraph.

The compatibilizer may be linear or cyclic aliphatic or aromatic hydrocarbon compatibilizer containing from 3 to 15 carbon atoms. The compatibilizer may be at least one hydrocarbon, which may be selected from the group consisting of at least propanes, including propylene and propane, butanes, including n-butane and isobutene, pentanes, including n-pentane, isopentane, neopentane and cyclopentane, hexanes, octanes, nonane, and decanes, among others. Commercially available hydrocarbon compatibilizers include but are not limited to those from Exxon Chemical (USA) sold under the trademarks Isopar® H, a mixture of undecane ($C_{11}$) and dodecane ($C_{12}$) (a high purity $C_{11}$ to $C_{12}$ iso-paraffinic), Aromatic 150 (a $C_9$ to $C_{11}$ aromatic), Aromatic 200 (a $C_9$ to $C_{15}$ aromatic) and Naptha 140 (a mixture of $C_5$ to $C_{11}$ paraffins, naphthenes and aromatic hydrocarbons) and mixtures thereof, meaning mixtures of any of the hydrocarbons disclosed in this paragraph.

The compatibilizer may alternatively be at least one polymeric compatibilizer. The polymeric compatibilizer may be a random copolymer of fluorinated and non-fluorinated acrylates, wherein the polymer comprises repeating units of at least one monomer represented by the formulae $CH_2=C(R^1)CO_2R^2$, $CH_2=C(R^3)C_6H_4R^4$, and $CH_2=C(R^5)C_6H_4XR^6$, wherein X is oxygen or sulfur; $R^1$, $R^3$, and $R^5$ are independently selected from the group consisting of H and $C_1$-$C_4$ alkyl radicals; and $R^2$, $R^4$, and $R^6$ are independently selected from the group consisting of carbon-chain-based radicals containing C, and F, and may further contain H, Cl, ether oxygen, or sulfur in the form of thioether, sulfoxide, or sulfone groups and mixtures thereof. Examples of such polymeric compatibilizers include those commercially available from E. I. du Pont de Nemours and Company, (Wilmington, DE, 19898, USA) under the trademark Zonyl®$^v$ PHS. Zonyl® PHS is a random copolymer made by polymerizing 40 weight percent $CH_2$=$C(CH_3)$ $CO_2CH_2CH_2(CF_2CF_2)mF$ (also referred to as Zonyl®$^v$ fluoromethacrylate or ZFM) wherein m is from 1 to 12, primarily 2 to 8, and 60 weight percent lauryl methacrylate ($CH_2$=$C(CH_3)CO_2(CH_2)_{11}CH_3$, also referred to as LMA).

In some embodiments, the compatibilizer component contains from about 0.01 to 30 weight percent (based on total amount of compatibilizer) of an additive which reduces the surface energy of metallic copper, aluminum, steel, or other metals and metal alloys thereof found in heat exchangers in a way that reduces the adhesion of lubricants to the metal. Examples of metal surface energy reducing additives include those commercially available from DuPont under the trademarks Zonyl® FSA, Zonyl® FSP, and Zonyl® FSJ.

Another optional non-refrigerant component which may be used with the compositions of the present invention may be a metal surface deactivator. The metal surface deactivator is selected from the group consisting of areoxalyl bis (benzylidene) hydrazide (CAS reg no. 6629-10-3), N,N'-bis(3, 5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof, meaning mixtures of any of the metal surface deactivators disclosed in this paragraph.

The optional non-refrigerant component used with the compositions of the present invention may alternatively be a stabilizer selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof, meaning mixtures of any of the stabilizers disclosed in this paragraph.

The stabilizer may be selected from the group consisting of tocopherol; hydroquinone; t-butyl hydroquinone; monothiophosphates; and dithiophosphates, commercially available from Ciba Specialty Chemicals, Basel, Switzerland, hereinafter "Ciba", under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168 and Tris-(di-tert-butylphenyl)phosphite, commercially available from Ciba under the trademark Irgafos® OPH; (Di-n-octylphosphite); and iso-decyl diphenyl phosphite, commercially available from Ciba under the trademark Irgafos® DDPP; trialkyl phosphates, such as trimethyl phosphate, triethylphosphate, tributyl phosphate, trioctyl phosphate, and tri(2-ethylhexyl)phosphate; triaryl phosphates including triphenyl phosphate, tricresylphosphate, and trixylenyl phosphate; and mixed alkyl-aryl phosphates including isopropylphenyl phosphate (IPPP), and bis(t-butylphenyl)phenyl phosphate (TBPP); butylated triphenyl phosphates, such as those commercially available under the trademark Syn-O-Ad® including Syn-O-Ad® 8784; tert-butylated triphenyl phosphates such as those commercially available under the trademark Durad®620; isopropylated triphenyl phosphates such as those commercially available under the trademarks Durad® 220 and Durad®110; anisole; 1,4-dimethoxybenzene; 1,4-diethoxybenzene; 1,3,5-trimethoxybenzene; myrcene, alloocimene, limonene (in particular, d-limonene); retinal; pinene; menthol; geraniol; farnesol; phytol; Vitamin A; terpinene; delta-3-carene; terpinolene; phellandrene; fenchene; dipentene; caratenoids, such as lycopene, beta carotene, and xanthophylls, such as zeaxanthin; retinoids, such as hepaxanthin and isotretinoin; bomane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox®PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and mixtures and combinations thereof.

The optional non-refrigerant component used with the compositions of the present invention may alternatively be an ionic liquid stabilizer. The ionic liquid stabilizer may be selected from the group consisting of organic salts that are liquid at room temperature (approximately 25° C.), those salts containing cations selected from the group consisting of pyridinium, pyridazinium, pyrimidinium, pyrazinium, imidazolium, pyrazolium, thiazolium, oxazolium and triazolium and mixtures thereof; and anions selected from the group consisting of $[BF_4]$—, $[PF_6]$—, $[SbF_6]$—, $[CF_3SO_3]$—, $[HCF_2CF_2SO_3]$—, $[CF_3HFCCF_2SO_3]$—, $[HCClFCF_2SO_3]$—, $[(CF_3SO_2)_2N]$—, $[(CF_3CF_2SO_2)_2N]$—, $[(CF_3SO_2)_3C]$—, $[CF_3CO_2]$—, and F— and mixtures thereof. In some embodiments, ionic liquid stabilizers are selected from the group consisting of emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

In some embodiments, the stabilizer may be a hindered phenol, which is any substituted phenol compound, including phenols comprising one or more substituted or cyclic, straight chain, or branched aliphatic substituent group, such as, alkylated monophenols including 2,6-di-tert-butyl-4-methylphenol; 2,6-di-tert-butyl-4-ethylphenol; 2,4-dimethyl-6-tertbutylphenol; tocopherol; and the like, hydroquinone and alkylated hydroquinones including t-butyl hydroquinone, other derivatives of hydroquinone; and the like, hydroxylated thiodiphenyl ethers, including 4,4'-thiobis(2-methyl-6-tert-butylphenol); 4,4'-thiobis(3-methyl-6-tertbutylphenol); 2,2'-thiobis(4methyl-6-tert-butylphenol); and the like, alkylidene-bisphenols including,: 4,4'-methylenebis(2,6-di-tert-butylphenol); 4,4'-bis(2,6-di-tert-butylphenol); derivatives of 2,2'- or 4,4-biphenoldiols; 2,2'-methylenebis(4-ethyl-6-tertbutylphenol); 2,2'-methylenebis(4-methyl-6-tertbutylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol; 2,2'-methylenebis(4-methyl-6-cyclohexylphenol, 2,2- or 4,4-biphenyldiols including 2,2'-methylenebis(4-ethyl-6-tert-butylphenol); butylated hydroxytoluene (BHT, or 2,6-di-tert-butyl-4-methylphenol), bisphenols comprising heteroatoms including 2,6-di-tert-alpha-dimethylamino-p-cresol, 4,4-thiobis(6-tert-butyl-m-cresol); and the like; acylaminophenols; 2,6-di-tert-butyl-4(N,N'-dimethylaminomethylphenol); sulfides including; bis(3-methyl-4-hydroxy-5-tert-butylbenzyl)sulfide; bis(3,5-di-tert-butyl-4-hydroxybenzyl) sulfide and mixtures thereof, meaning mixtures of any of the phenols disclosed in this paragraph.

In some embodiments, a stabilizer may be a single stabilizing compound as described in detail above. In other embodiments, a stabilizer may be a mixture of two or more of the stabilizing compounds, either from the same class of compounds or from differing classes of compounds, said classes being described in detail above.

The optional non-refrigerant component which is used with compositions of the present invention may alternatively be a tracer. The tracer may be a single compound or two or more tracer compounds from the same class of compounds or from different classes of compounds. In some embodiments, the tracer is present in the compositions at a total concentration of about 1 part per million by weight (ppm) to about 5000 ppm, based on the weight of the total composition. In other embodiments, the tracer is present at a total concentration of about 10 ppm to about 1000 ppm. In other embodiments, the tracer is present at a total concentration of about 20 ppm to about 500 ppm. In other embodiments, the tracer is present at a total concentration of about 25 ppm to about 500 ppm. In other embodiments, the tracer is present at a total concentration of about 50 ppm to about 500 ppm. Alternatively, the tracer is present at a total concentration of about 100 ppm to about 300 ppm.

The tracer may be selected from the group consisting of hydrofluorocarbons (HFCs), deuterated hydrofluorocarbons, chlorofluororcarbons (CFCs), hydrofluorochlorocarbons (HCFCs), chlorocarbons, perfluorocarbons, fluoroethers, brominated compounds, iodated compounds, alcohols, aldehydes and ketones, nitrous oxide and combinations thereof. Alternatively, the tracer may be selected from the group consisting of trifluoromethane (HFC-23), dichlorodifluoromethane (CFC-12), chlorodifluoromethane HCFC-22), methyl chloride (R-40), chlorofluoromethane (HCFC-31), fluoroethane (HFC-161), 1,1,-difluoroethane (HFC-152a), 1,1,1-trifluoroethane (HFC-143a), chloropentafluoroethane (CFC-115), 1,2-dichloro-1,1,2,2-tetrafluoroethane (CFC-114), 1,1-dichloro-1,2,2,2-tetrafluoroethane (CFC-114a), 2-chloro-1,1,1,2-tetrafluoroethane (HCFC-124), pentafluoroethane (HFC-125), 1,1,2,2-tetrafluoroethane (HFC-134), 1,1,1,2-tetrafluoroethane (HFC-134a), 1,1,1,3,3,3-hexafluoropropane (HFC-236fa), 1,1,1,2,3,3,3-heptafluoropropane (HFC-227ea), 1,1,1,2,2,3,3-heptafluoropropane (HFC-227ea), 1,1,1,3,3-pentafluoropropane(HFC-245fa), 1,1,1,2,2-pentafluoropropane (HFC-245cb), 1,1,1,2,3-pentafluoropropane (HFC-245eb), 1,1,2,2-tetrafluoropropane (HFC-254cb), 1,1,1,2-tetrafluoropropane (HFC-254eb), 1,1,1-trifluoropropane (HFC-263fb), 1,1-difluoro-2-chloroethylene (HCFC-1122), 2-chloro-1,1,2-trifluoroethylene (CFC-1113), 1,1,1,3,3-pentafluorobutane (HFC-365mfc), 1,1,1,2,3,4,4,5,5,5-decafluoropentane (HFC-43-10mee), 1,1,1,2,2,3,4,5,5,6,6,7,7,7-tetradecafluoroheptane, hexafluorobutadiene, 3,3,3-trifluoropropyne, iodotrifluoromethane, deuterated hydrocarbons, deuterated hydrofluorocarbons, perfluorocarbons, fluoroethers, brominated compounds, iodated compounds, alcohols, aldehydes, ketones, nitrous oxide (N20) and mixtures thereof. In some embodiments, the tracer is a blend containing two or more hydrofluorocarbons, or one hydrofluorocarbon in combination with one or more perfluorocarbons. In other embodiments, the tracer is a blend of at least one CFC and at least one HCFC, HFC, or PFC.

The tracer may be added to the compositions of the present invention in predetermined quantities to allow detection of any dilution, contamination or other alteration of the composition. Additionally, the tracers may allow detection of product that infringes existing patent rights, by identification of the patent owner's product versus competitive infringing product. Further, in one embodiment, the tracer compounds may allow detection of a manufacturing process by which a product is produced, thus, allowing detection of infringement of a patent to specific manufacturing process chemistry.

The additive which may be used with the compositions of the present invention may alternatively be a perfluoropolyether as described in detail in US2007-0284555, incorporated herein by reference.

It will be recognized that certain of the additives referenced above as suitable for the non-refrigerant component have been identified as potential refrigerants. However, in accordance with this invention, when these additives are used, they are not present at an amount that would affect the novel and basic characteristics of the refrigerant mixtures of this invention. Preferably, the refrigerant mixtures and the compositions of this invention containing them, contain no more than about 0.5 weight percent of the refrigerants other than HFC-32, HFO-1234yf, and $CO_2$.

In some embodiments, the transfer, treatment, and storage of the refrigerant compositions may be conducted using equipment and processes meeting ATEX guidelines. In some embodiments, the equipment and processes meet one or more of Directive 99/92/EC (ATEX 137) and/or Directive 94/9/EC (ATEX 95). In one embodiment, some or all of the modules of the treatment unit 130 meet one or more of Directive 99/92/EC (ATEX 137) and/or Directive 94/9/EC (ATEX 95). In one embodiment, all the modules of treatment area 130 meet one or more of Directive 99/92/EC (ATEX 137) and/or Directive 94/9/EC (ATEX 95). In some embodiments, sources of ignition may be reduced by reducing static charge/discharge. In one embodiment, the equipment may be electrically grounded. In some embodiments, the transfer, treatment, and storage of the refrigerant compositions may be conducted using equipment and processes meeting NFPA guidelines. In some embodiments, the equipment and processes meet one or more of NFPA 497/NFPA 90, and/or NFPA 69 requirements. In one embodiment, some or all of the modules of the treatment unit 130 meet one or more of NFPA 497/NFPA 90 and/or NFPA 69 requirements.

Figure 2:
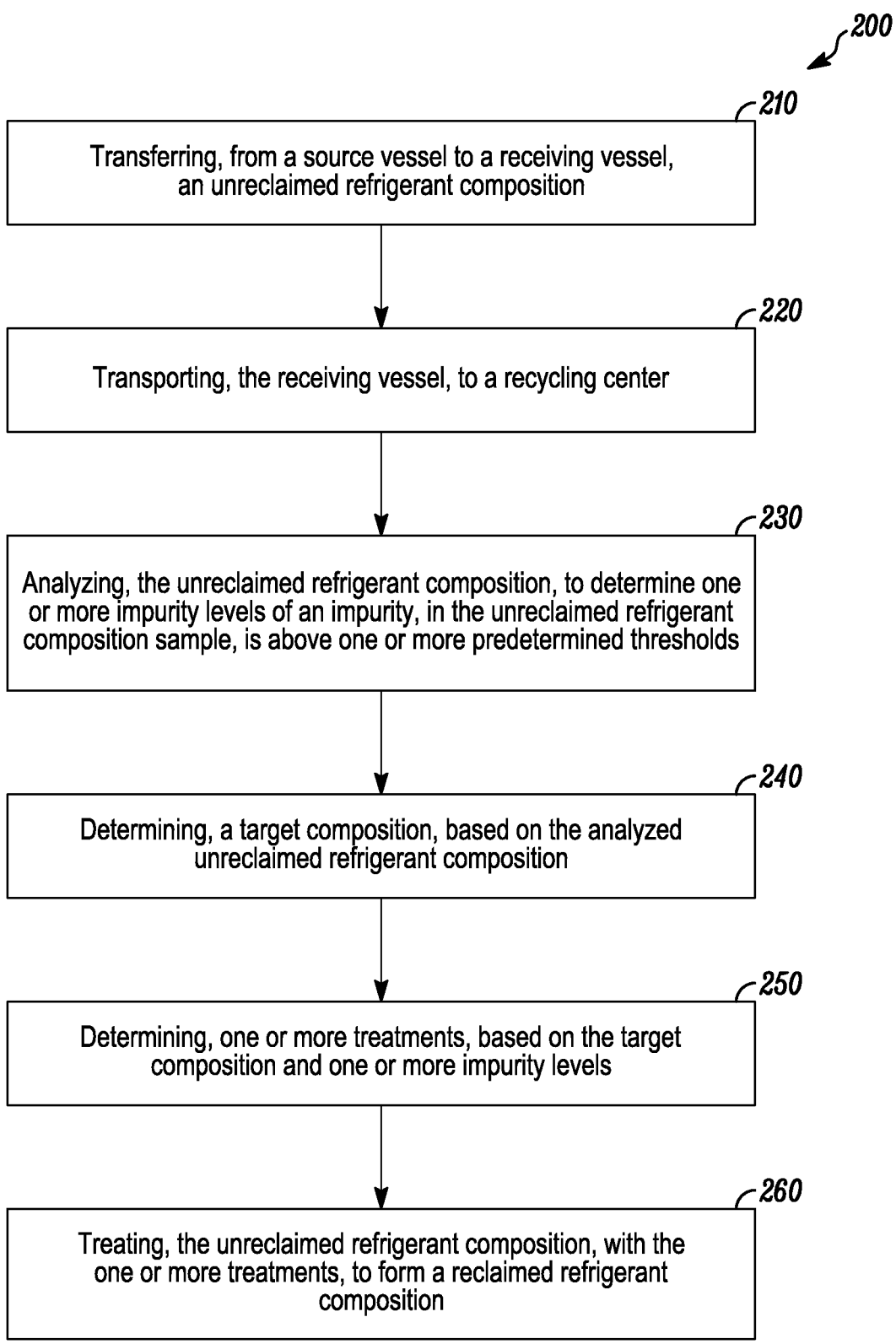
FIG. 2 is a block diagram of a method of reclaiming refrigerant, according to an embodiment.

A method 200 of reclaiming a refrigerant is described in FIG. 2. At block 210, transferring, from a source vessel to a receiving vessel, an unreclaimed refrigerant composition. At block 220, transporting, the receiving vessel, to a recycling center. At block 230, analyzing, the unreclaimed refrigerant composition, to determine one or more impurity levels of an impurity, in the unreclaimed refrigerant composition sample, is above one or more predetermined thresholds. At block 240, determining, a target composition, based on the analyzed unreclaimed refrigerant composition. At block 250, determining, one or more treatments, based on the target composition and one or more impurity levels. At block 260, treating, the unreclaimed refrigerant composition, with the one or more treatments, to form a reclaimed refrigerant composition. During treatment one or more impurity levels of the reclaimed refrigerant composition is reduced below the one or more predetermined thresholds.

Figure 3:
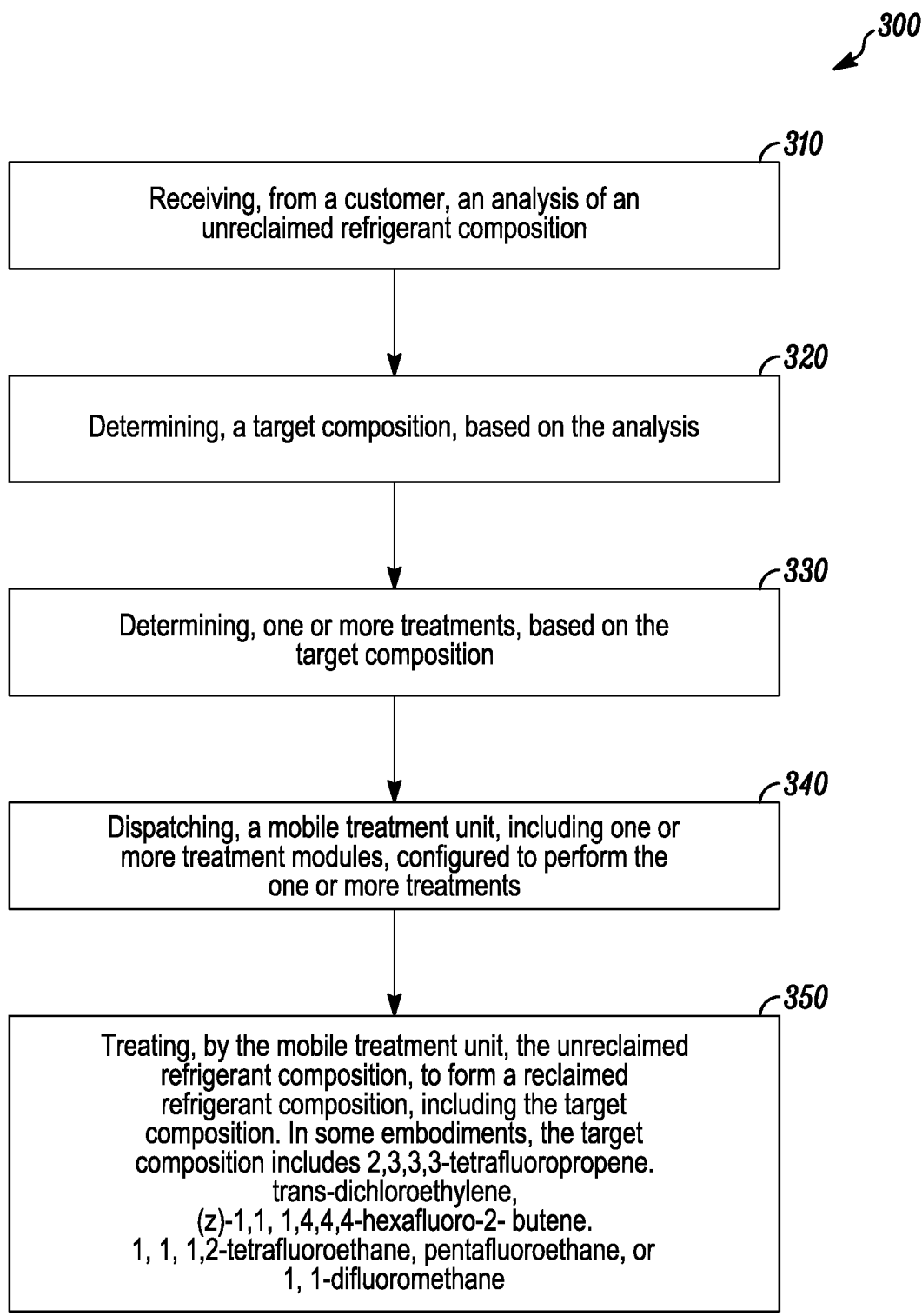
FIG. 3 is a block diagram of a method of reclaiming refrigerant, according to an embodiment.

A method 300 of reclaiming a refrigerant is described in FIG. 3. At block 310, receiving, from a customer, an analysis of an unreclaimed refrigerant composition. At block 320, determining, a target composition, based on the analysis. At block 330, determining, one or more treatments, based on the target composition. At block 340, dispatching, a mobile treatment unit, including one or more treatment modules, configured to perform the one or more treatments. At block 350, treating, by the mobile treatment unit, the unreclaimed refrigerant composition, to form a reclaimed refrigerant composition, including the target composition. In some embodiments, the target composition includes at least one of 2,3,3,3-tetrafluoropropene, trans-1,3,3,3-tetrafluoro-1-propene, trans-1-chloro-3,3,3-trifluoropropene (HCFO-1233zd (E)), trans-dichloroethylene, (Z)-1,1,1,4,4,4-hexafluoro-2-butene, 1,1,1,2-tetrafluoroethane, pentafluoroethane, or 1,1-difluoromethane. In one embodiment, the target composition includes 2,3,3,3-tetrafluoropropene.

The following Examples are provided to illustrate certain embodiments of the invention and shall not limit the scope of the appended claims.

Example #1

A sample of HFO-1234yf refrigerant was tested for non-volatile residue and found to have a residue level (residue>100 ppm by weight.) For this HFO-1234yf sample, residue only appeared when all of the refrigerant was evaporated, hence the residue was not hard particulate matter, but some sort of dissolved substance and could not be removed via mesh screens. However, the residue can be separated from the refrigerant based on the residue having limited solubility in the refrigerant vapor phase. Using a gas compressor to transfer the vapor phase of the HFO-1234yf refrigerant, the residue can be separated from the refrigerant. The refrigerant gas is conveyed to a new container while the residue is left behind in the original container. The heel or refrigerant that remains in the original container can be destroyed through incineration. Typically, the vapor recovery process results in about an 80-90% yield of "reclaimed refrigerant" depending on the refrigerant composition. The gas compressor used to move or transfer refrigerant vapor can be any type of oil-free industrial gas compressor (vertical or horizontal) which can properly convey fluorinated refrigerants based on the flammability and pressure of the refrigerants being reclaimed. If desired, it is possible to use a single stage or double stage compressor or a combination of multiple gas compressors.

A Corken Brand single stage oil-free industrial gas compressor with the following specification was used to convey refrigerant from one ISO container to a cleaned, purged ISO container.

| D-style (single- distance piece) | | D491 |
|---|---|---|
| Stroke inches (mm) | | 3.0 (76.2) |
| Piston displacement CFM | @ 400 rpm | 17.5 (29.7) |
| (m³/hr) | @ 825 rpm | 36.0 (61.2) |
| Maximum working pressure psig (bar g) | | 335 (23.1) |
| Maximum brake horsepower (kW) | | 15 (11) |
| Maximum discharge temperature ° F. (° C.)$^b$ | | 350 (177) |

The compressor was set to with a temperature cut-out setting of 100 C maximum.

Data from the vapor recovery process is shown below:

Example #1

| Initial Container | Initial NVR | Transfer Container | Final NVR |
|---|---|---|---|
| Ton tank | 56 ppm | Ton Tank | ~0 ppm |

The reclaimed refrigerant product was found to have NVR<50 ppm by weight and determined to be acceptable for use as a refrigerant. Reclaimed refrigerant should have NVR<20 ppm by weight to account for different contaminant densities. The reclaimed refrigerant was then analyzed per AHRI 700 and determined to meet the required specification for HFO-1234yf thereby confirming that the reclaim process did not impact the product purity, moisture, acid, color or other release properties.

Example #2

A refrigerant can be processed by re-blending the neat or existing blend with other materials to form a new blend or, if some cases, an improved performance blend. This may occur in conjunction with the other processes mentioned herein or separately if the composition of the refrigerant blend does not meet a target composition.

Blending to achieve product compositional changes requires that reclaimed refrigerants are transferred such that any undesirable material (a high MW lubricant or dissolved polymeric such as a grease) is left in a "heel" form in the original container. Reclaimed refrigerant denoted as component "A" can be liquid transferred such that the undesirable heel (which contains the lubricant or dissolved polymeric) is left in the vapor heel portion of the original ISO. A new, virgin component "B" can be then added to the new ISO container such that the resulting blend is some composition of "A" and "B" with properties that meet new specification.

Example #3

Furthermore, it may desirable to remove moisture from reclaimed refrigerant. Reclaimed refrigerant is passed over molecular sieves (driers) such that moisture is trapped within the sieves.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method of reclaiming refrigerant, comprising:
    transferring an unreclaimed refrigerant composition including one or more hydrofluoro olefins, from a source vessel to a receiving vessel, at least one of the source vessel and the receiving vessel being a vertical cylinder, wherein a bottom of the vertical cylinder has an integrated pallet and/or wherein the vertical cylinder has bottom valves;
    transporting the receiving vessel to a treatment center;
    performing an analysis selected from the group consisting of gas chromatography, mass spectrometry, atomic absorption spectroscopy, flame emission spectroscopy, infra-red spectroscopy, and combinations thereof on the unreclaimed refrigerant composition to determine a composition of the unreclaimed refrigerant composition sample;
    determining a target composition based on the analyzed unreclaimed refrigerant composition;
    determining one or more treatments based on the target composition;
    performing at least one treatment selected from the group consisting of transferring, blending, distillation, nitrogen purging, filtration, dehydration, caustic scrubbing, decanting, and combinations thereof to form a partially reclaimed refrigerant composition or a reclaimed refrigerant composition,
    wherein the reclaimed refrigerant composition is equal to the target composition.

2. The method of claim 1, further comprising:
    adding an additive to the reclaimed refrigerant composition;
    wherein the additive is present in a concentration less than 0.4 weight percent based on the reclaimed refrigerant composition.

3. The method of claim 1, wherein the target composition includes at least one primary component and at least one secondary component.

4. The method of claim 3, wherein the at least one treatment increases a concentration ratio of the at least one primary component to the at least one secondary component, based on a total weight of the unreclaimed refrigerant composition.

5. The method of claim 1, wherein the treatment includes transferring the unreclaimed refrigerant from the receiving vessel to a treatment vessel.

6. The method of claim 1, wherein the treatment includes blending and transferring the unreclaimed refrigerant from the receiving vessel to a treatment vessel.

7. The method of claim 1, wherein the unreclaimed refrigerant composition includes 2,3,3,3-tetrafluoropropene, trans-1,3,3,3-tetrafluoro-1-propene, trans-1-chloro-3,3,3-trifluoropropene, trans-dichloroethylene, (Z)-1,1,1,4,4,4-hexafluoro-2-butene, 1,1,1,2-tetrafluoroethane, pentafluoroethane, or 1,1-difluoromethane.

8. The method of claim 1, wherein the unreclaimed refrigerant composition includes 2,3,3,3-tetrafluoropropene and trans-dichloroethylene, (Z)-1,1,1,4,4,4-hexafluoro-2-butene, 1,1,1,2-tetrafluoroethane, pentafluoroethane, or 1,1-difluoromethane.

9. The method of claim 1, wherein the unreclaimed refrigerant composition includes an oil.

10. The method of claim 9, wherein the oil includes a polyolester, polyalkylene glycol or polyvinylether.

11. The method of claim 1, wherein the one or more treatments include transfer, blending, filtration, and combinations thereof.

12. The method of claim 1, wherein the unreclaimed refrigerant composition includes at least two immiscible compounds.

13. The method of claim 12, wherein the treatment includes decanting.

14. The method of claim 1, wherein a purity of the reclaimed refrigerant composition is greater than 99.5 weight percent, based on a total weight of the refrigerant composition.

15. The method of claim 1, wherein the one or more treatments includes at least two treatments.

16. The method of claim 15, wherein the target composition includes at least one primary component and at least one secondary component, and wherein a first treatment increases a concentration ratio of the at least one primary component to the at least one secondary component, based on a total weight of the unreclaimed refrigerant composition.

17. The method of claim 16, wherein the first treatment includes transfer or blending.

18. A partially reclaimed refrigerant composition formed by the method of claim 17.

19. The method of claim 16, wherein the partially reclaimed refrigerant composition is treated with a second treatment to form the reclaimed refrigerant composition.

20. The method of claim 19, wherein the second treatment increases a concentration ratio of the at least one primary component to the at least one secondary component, based on a total weight of the partially reclaimed refrigerant composition.

21. A partially reclaimed refrigerant composition formed by the method of claim 1.

22. The method of claim 1, wherein the bottom valves are protected by a collar.

23. The method of claim 1, wherein one or more of the refrigerants of the unreclaimed refrigerant composition comprises a flammable refrigerant.

24. A method of reclaiming refrigerant, comprising:
    transferring an unreclaimed refrigerant composition including one or more hydrofluoro olefins, from a source vessel to a receiving vessel, at least one of the source vessel and the receiving vessel being a vertical cylinder, wherein a bottom of the vertical cylinder has an integrated pallet and/or wherein the vertical cylinder has bottom valves;
    determining a target composition, the target composition including at least one primary component and at least one secondary component;
    determining one or more treatments based on the target composition;
    performing at least one treatment selected from the group consisting of transferring, blending, distillation, nitrogen purging, filtration, dehydration, caustic scrubbing, decanting, and combinations thereof to form a partially reclaimed refrigerant composition or a reclaimed refrigerant composition wherein the at least one secondary component includes non-condensable material, in a concentration of greater than 1.5 volume percent at 25 degrees Celsius, per AHRI 700.

25. The method of claim 24, wherein the non-condensable material includes a fluorinated oligomer.

26. The method of claim 24, wherein the non-condensable material includes an oxidized polyolester.

27. A method of reclaiming refrigerant, comprising:
transferring an unreclaimed refrigerant composition including one or more hydrofluoro olefins, from a source vessel to a receiving vessel, at least one of the source vessel and the receiving vessel being a vertical cylinder, wherein a bottom of the vertical cylinder has an integrated pallet and/or wherein the vertical cylinder has bottom valves;
determining a target composition, the target composition including at least one primary component and at least one secondary component;
determining at least two treatments based on the target composition;
performing at least one treatment selected from the group consisting of transferring, blending, distillation, nitrogen purging, filtration, dehydration, caustic scrubbing, decanting, and combinations thereof to form a partially reclaimed refrigerant composition or a reclaimed refrigerant composition,
wherein a first treatment increases a concentration ratio of the at least one primary component to the at least one secondary component based on a total weight of the unreclaimed refrigerant composition, and a second treatment increases a concentration ratio of the at least one primary component to the at least one secondary component based on a total weight of the partially reclaimed refrigerant composition,
wherein the partially reclaimed refrigerant composition is treated with the second treatment to form the reclaimed refrigerant composition, and
wherein the second treatment includes (i) filtration through a 0.1 micrometer or smaller screen, or (ii) dehydration.

28. The method of claim 27,
wherein the unreclaimed refrigerant composition is contacted with a desiccant;
wherein a water concentration of the unreclaimed refrigerant composition is reduced by at least 0.5 weight percent, based on the total weight of the unreclaimed refrigerant composition; and
wherein the water concentration is reduced to below 0.5 weight percent, based on the total weight of the partially reclaimed refrigerant composition.

29. A method of reclaiming refrigerant, comprising:
transferring an unreclaimed refrigerant composition including one or more hydrofluoro olefins, from a source vessel to a receiving vessel, at least one of the source vessel and the receiving vessel being a vertical cylinder, wherein a bottom of the vertical cylinder has an integrated pallet and/or wherein the vertical cylinder has bottom valves;
determining a target composition, the target composition including at least one primary component and at least one secondary component;
determining at least two treatments based on the target composition;
performing at least one treatment selected from the group consisting of transferring, blending, distillation, nitrogen purging, filtration, dehydration, caustic scrubbing, decanting, and combinations thereof to form a partially reclaimed refrigerant composition or a reclaimed refrigerant composition,
wherein a first treatment increases a concentration ratio of the at least one primary component to the at least one secondary component based on a total weight of the unreclaimed refrigerant composition,
wherein the partially reclaimed refrigerant composition is treated with the second treatment to form the reclaimed refrigerant composition,
wherein an oil concentration of the unreclaimed refrigerant composition is reduced by at least 0.5 weight percent, based on the total weight of the unreclaimed refrigerant composition; and
wherein the oil concentration is reduced to below 0.5 weight percent, based on the total weight of the partially reclaimed refrigerant composition.

30. A method of reclaiming refrigerant, comprising:
receiving, from a customer, an analysis of an unreclaimed refrigerant composition;
determining, a target composition, based on the analysis, the target composition including at least one primary component and at least one secondary component;
determining, one or more treatments, based on the target composition;
dispatching, a mobile treatment unit, including one or more treatment modules, configured to perform the one or more treatments;
treating, by the mobile treatment unit, the unreclaimed refrigerant composition which is stored in a vertical cylinder, wherein a bottom of the vertical cylinder has an integrated pallet and/or wherein the vertical cylinder has bottom valves, to form a reclaimed refrigerant composition, including the target composition;
wherein the target composition includes 2,3,3,3-tetrafluoropropene, trans-1,3,3,3-tetrafluoro-1-propene, trans-1-chloro-3,3,3-trifluoropropene, trans-dichloroethylene, (Z)-1,1,1,4,4,4-hexafluoro-2-butene, 1,1,1,2-tetrafluoroethane, pentafluoroethane, or 1,1-difluoromethane, and
wherein the at least one secondary component includes non-condensable material, in a concentration of greater than 1.5 volume percent at 25 degrees Celsius, per AHRI 700.

31. The method of claim 30, wherein the one or more treatment modules includes one or more of a blending module, a distillation module, a nitrogen purging module, a filtration module, a dehydration module, a caustic scrubbing module, or a decanting module.

32. The method of claim 31, wherein the one or more treatment modules are electrically grounded.

33. The method of claim 31, wherein the target composition is at least 99.5 percent pure.

34. The method of claim 30, wherein the bottom valves are protected by a collar.

35. The method of claim 30, wherein one or more of the refrigerants of the unreclaimed refrigerant composition comprises a flammable refrigerant.

* * * * *